(12) United States Patent
Yang et al.

(10) Patent No.: US 12,439,117 B2
(45) Date of Patent: Oct. 7, 2025

(54) OPTICAL LINK SUPPORTING HDMI

(71) Applicant: OPTICIS CO., LTD., Seongnam-si (KR)

(72) Inventors: Dong Pyeong Yang, Seongnam-si (KR); Doo Soo Ha, Seoul (KR)

(73) Assignee: OPTICIS CO., LTD., Gyeonggi-Do (KR)

( * ) Notice: Subject to any disclaimer, the term of this patent is extended or adjusted under 35 U.S.C. 154(b) by 53 days.

(21) Appl. No.: 18/400,747

(22) Filed: Dec. 29, 2023

(65) Prior Publication Data

US 2024/0223846 A1 Jul. 4, 2024

(30) Foreign Application Priority Data

Dec. 30, 2022 (KR) .................. 10-2022-0191031

(51) Int. Cl.
  *H04N 21/4363* (2011.01)
  *H04N 7/22* (2006.01)

(52) U.S. Cl.
  CPC ......... *H04N 21/43635* (2013.01); *H04N 7/22* (2013.01)

(58) Field of Classification Search
  CPC .... H04N 21/43635; H04N 7/22; G09G 5/006; G09G 5/008; G09G 2370/12; G09G 2370/18
  See application file for complete search history.

(56) References Cited

U.S. PATENT DOCUMENTS

| | | | |
|---|---|---|---|
| 7,729,874 B2 | 6/2010 | Keady et al. | |
| 8,274,362 B2 | 9/2012 | Sato et al. | |
| 9,832,420 B2 | 11/2017 | Oh | |
| 2010/0271486 A1* | 10/2010 | Bohm | H04N 21/6118 348/180 |
| 2012/0173769 A1* | 7/2012 | Loo | G06F 3/1454 710/14 |
| 2013/0010848 A1 | 1/2013 | Shimizu et al. | |
| 2016/0308668 A1* | 10/2016 | Kim | H04L 7/041 |
| 2017/0244927 A1* | 8/2017 | Kim | H04N 7/173 |
| 2022/0158814 A1* | 5/2022 | Yu | H04L 5/1461 |

FOREIGN PATENT DOCUMENTS

| | | |
|---|---|---|
| JP | 2010-508739 A | 3/2010 |
| KR | 2009-0071363 A | 7/2009 |
| KR | 2011-0002300 A | 1/2011 |
| KR | 2012-0130954 A | 12/2012 |
| WO | WO-2012137274 A1 * | 10/2012 ....... H04N 21/42207 |

OTHER PUBLICATIONS

International Search Report for App. No. PCT/KR2023/021868, dated Mar. 28, 2024 (10 Pages).

* cited by examiner

*Primary Examiner* — Michael Lee
(74) *Attorney, Agent, or Firm* — NIXON PEABODY LLP; Jeffrey L. Costellia

(57) ABSTRACT

Provided is an optical link capable of preventing data transmission errors due to transmission delay. Also, provided is an optical link enabling rapid transmission of auxiliary data related to rendering of a display sink or setting of a main channel.

16 Claims, 20 Drawing Sheets

OPTICAL LINK SUPPORTING HDMI

CROSS-REFERENCE TO RELATED APPLICATION

This application is based on and claims priority under 35 U.S.C. § 119 to Korean Patent Application No. 10-2022-0191031, filed on Dec. 30, 2022, in the Korean Intellectual Property Office, the disclosure of which is incorporated by reference herein in its entirety.

BACKGROUND

1. Field

The disclosure relates to an optical link for a high definition multimedia interface (HDMI), and more particularly, to an optical link capable of preventing data transmission errors caused by transmission delays.

2. Description of the Related Art

Optical links provide an interface for optical communication between a source device that generates an image signal and a sink device that forms an image from the image signal of the source device. The optical links may include an image signal line for transmitting image data and an auxiliary signal line for transmitting auxiliary data for the configuration information about the source device or the sink device in addition to the image data.

SUMMARY

Provided is an optical link capable of preventing data transmission errors due to transmission delay.

Provided is an optical link enabling rapid transmission of auxiliary data related to rendering of a display sink or setting of a main channel.

Additional aspects will be set forth in part in the description which follows and, in part, will be apparent from the description, or may be learned by practice of the presented embodiments of the disclosure.

According to an aspect of the disclosure, an optical link
is connected between a display source and a display sink to constitute a high-definition multimedia interface (HDMI) system and forms a main channel for transmitting main data including image information and a display data channel (DDC) that includes a clock line for transmitting a clock signal and a data line for transmitting auxiliary data that matches the clock signal. In the optical link, in response to a request from the display source, the auxiliary data transmitted from the display sink in match with a clock signal having transmission delay on the display sink from the display source is stored, and the stored auxiliary data is transmitted to the display source so that the auxiliary data is matched with a clock signal on the display source having little or no transmission delay.

According to another aspect of the disclosure, an optical link
is connected between a display source and a display sink to constitute a high-definition multimedia interface (HDMI) system and including a main channel for transmitting main data including image information and a display data channel (DDC) that transmits auxiliary data related to rendering of the display sink.

The optical link includes a control logic circuit, which stores the auxiliary data transmitted via the DDC between the display source and the display sink and is involved in transmission of the auxiliary data according to a request for the auxiliary data transmitted from the display source to the display sink and a response to the request, and
the control logic circuit determines whether the auxiliary data requested from the display source is transmittable, and transmits the stored auxiliary data to the display source together with an acknowledgment (ACK) signal indicating whether the display sink receives the request for the auxiliary data.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
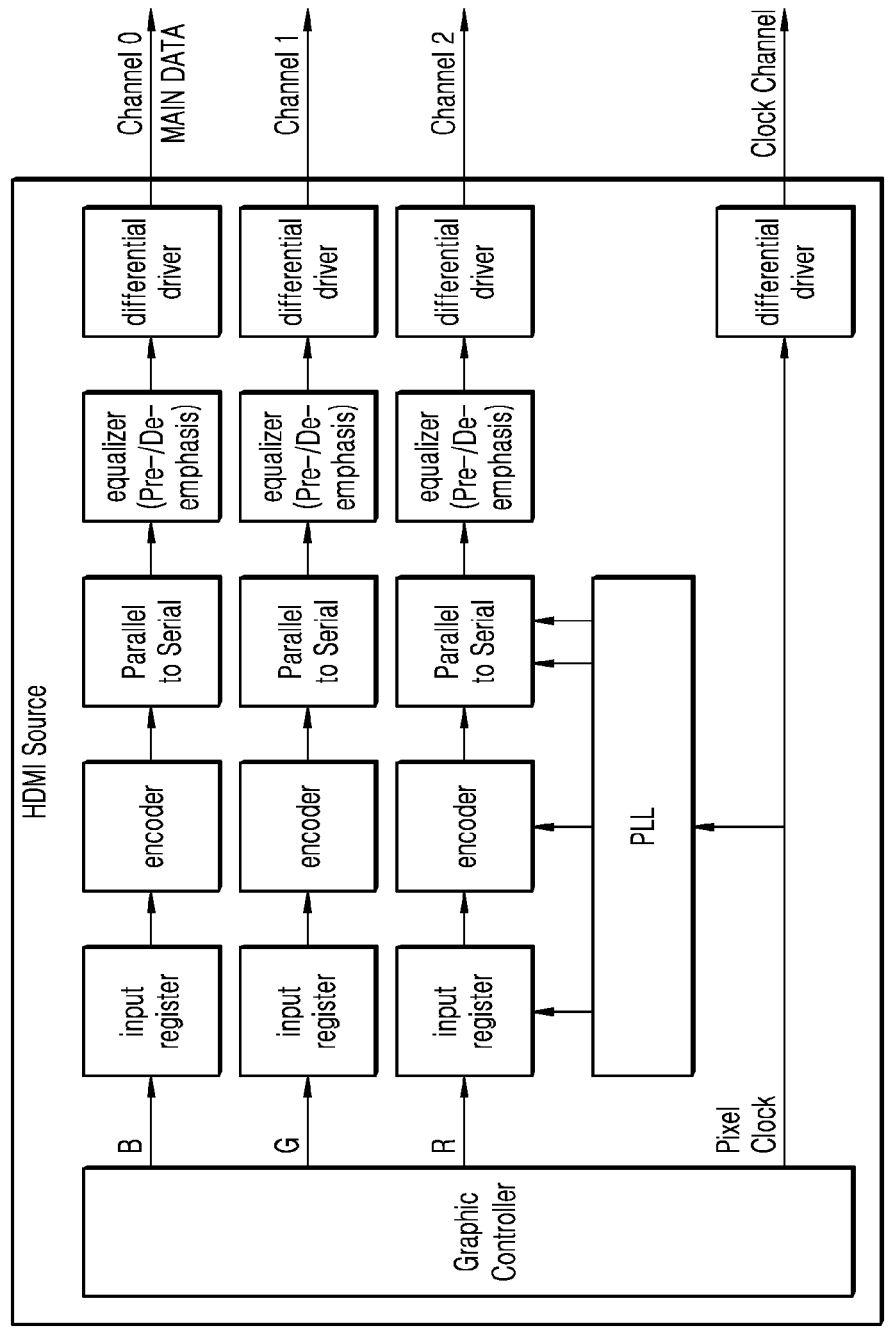
FIG. 1 shows a block diagram showing the configuration of a HDMI source that constitutes a high-definition multimedia interface (HDMI) system.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an aspect of the disclosure, an optical link
is connected between a display source and a display sink to constitute a high-definition multimedia interface (HDMI) system and forms a main channel for transmitting main data including image information and a display data channel (DDC) that includes a clock line for transmitting a clock signal and a data line for transmitting auxiliary data that matches the clock signal. In the optical link, in response to a request from the display source, the auxiliary data transmitted from the display sink in match with a clock signal having transmission delay on the display sink from the display source is stored, and the stored auxiliary data is transmitted to the display source so that the auxiliary data is matched with a clock signal on the display source having little or no transmission delay.

For example, the clock signal on the display source may be transmitted via the DDC and form the clock signal having transmission delay on the display sink.

For example, in the optical link, depending on contents of the auxiliary data, an acknowledgment (ACK) signal, extended display identification data (EDID), and high bandwidth digital content protection (HDCP) data, which correspond to the response to the request from the display source, may be identified and transmitted to match the clock signal on the display source.

For example, in the optical link, depending on the auxiliary data, a stop signal regarding termination of the DDC that does not correspond to the response to the request from the display source may be not stored and transmitted to match the clock signal of the display source.

For example, the optical link may include a first control logic circuit adjacent to the display source and a second control logic circuit adjacent to the display sink, and
the first control logic circuit may store the auxiliary data according to contents of the auxiliary data and may transmit the stored auxiliary data to the display source to match the clock signal on the display source.

For example, in the optical link, the stored auxiliary data may be transmitted so that a rising edge of the auxiliary data is matched with a low signal of the clock signal on the display source.

For example, the display source may terminate communication of the DDC as a stop condition when a rising edge of the auxiliary data is matched with a high signal of the clock signal on the display source.

According to another aspect of the disclosure, an optical link
is connected between a display source and a display sink to constitute a high-definition multimedia interface (HDMI) system and forms a main channel for transmitting main data including image information and a display data channel (DDC) that includes a clock line for transmitting a clock signal and a data line for transmitting auxiliary data that matches the clock signal.

In response to a request from the display source, the clock signal on the display source, which is matched with the auxiliary data transmitted from the display sink, is adjusted.

For example, a low signal of the clock signal on the display source may be extended longer than a high signal of the clock signal on the display source.

For example, in the optical link, the low signal of the clock signal on the display source may be extended so that a rising edge of the auxiliary data matched with the clock signal on the display sink and transmitted from the display sink is matched with the low signal of the clock signal on the display source.

For example, in the optical link, depending on contents of the auxiliary data, an acknowledgment (ACK) signal, extended display identification data (EDID), and high bandwidth digital content protection (HDCP) data, which correspond to the response to the request from the display source, may be identified, and the clock signal on the display source, which is matched with the data corresponding to the response from the display sink, may be adjusted.

For example, the optical link may include
a first control logic circuit adjacent to the display source and a second control logic circuit adjacent to the display sink, and
the first control logic circuit may adjust the clock signal on the display source, which is matched with the auxiliary data transmitted from the display sink.

For example, the first control logic circuit may apply a control signal to a bipolar junction transistor (BJT) of an open collector or a field effect transistor (FET) of an open drain which is connected in parallel with a DDC communication unit of the display source between a pull-up resistor and ground.

According to another aspect of the disclosure, an optical link
is connected between a display source and a display sink to constitute a high-definition multimedia interface (HDMI) system and forms a main channel for transmitting main data including image information and a display data channel (DDC) that includes a clock line for transmitting a clock signal and a data line for transmitting auxiliary data that matches the clock signal.

In response to a request from the display source, the clock signal on the display sink, which is matched with the auxiliary data transmitted from the display sink, is adjusted.

For example, in the optical link, a high signal of the clock signal on the display sink may be shortened less than a low signal of the clock signal on the display sink.

For example, in the optical link, as the shortened high signal ends early, a rising edge of the auxiliary data transmitted from the display sink may begin early, and the high signal of the clock signal on the display sink may be shortened so that the rising edge of the auxiliary data is matched with the low signal of the clock signal on the display source.

For example, the optical link may include a first control logic circuit adjacent to the display source and a second control logic circuit adjacent to the display sink, and
the second control logic circuit may adjust the clock signal on the display sink, which is matched with the auxiliary data transmitted from the display sink.

For example, the second control logic circuit may apply a control signal to a bipolar junction transistor (BJT) of an open collector or a field effect transistor (FET) of an open drain which is connected in parallel with a DDC communication unit of the display sink between a pull-up resistor and ground.

According to another aspect of the disclosure, an optical link
is connected between a display source and a display sink to constitute a high-definition multimedia interface (HDMI) system and forms a main channel for transmitting main data including image information and a display data channel (DDC) that includes a clock line for transmitting a clock signal and a data line for transmitting auxiliary data that matches the clock signal.

In response to a request from the display source, the clock signal on the display source and the clock signal on the display sink, which are matched with the auxiliary data transmitted from the display sink, are adjusted together, wherein a low signal of the clock signal on the display source is adjusted to extend, and a high signal of the clock signal on the display sink is adjusted to shorten.

For example, the optical link may include a first control logic circuit connected adjacent to the display source, a second control logic circuit connected adjacent to the display sink, and an optical cable connected between the first and second control logic circuits,
the first control logic circuit may adjust the clock signal on the display source, which is matched with the auxiliary data transmitted from the display sink, and
the second control logic circuit may adjust the clock signal on the display sink, which is matched with the auxiliary data transmitted from the display sink.

For example, the clock signal on the display source and the clock signal on the display sink may be adjusted differently by optical coupling rather than conductive connection.

According to another aspect of the disclosure, an optical link
is connected between a display source and a display sink to constitute a high-definition multimedia interface (HDMI) system and including a main channel for transmitting main data including image information and a display data channel (DDC) that transmits auxiliary data related to rendering of the display sink.

The optical link includes a control logic circuit, which stores the auxiliary data transmitted via the DDC between the display source and the display sink and is involved in transmission of the auxiliary data according to a request for the auxiliary data transmitted from the display source to the display sink and a response to the request, and
the control logic circuit determines whether the auxiliary data requested from the display source is transmittable, and transmits the stored auxiliary data to the display source together with an acknowledgment (ACK) signal indicating whether the display sink receives the request for the auxiliary data.

For example, the control logic circuit
may transmit, to the display source, the ACK signal regarding whether the display sink receives the request for the auxiliary data, prior to the auxiliary data requested from the display source.

For example, the transmission of the auxiliary data according to the request for the auxiliary data from the display source and the response to the request may be performed by an inter-integrated circuit (I2C) data frames transmitted on the DDC, and
the control logic circuit
may determine whether the auxiliary data requested from the display source is transmittable from a device address including address information of the display sink to which the auxiliary data is requested and a register address including register address information of the requested auxiliary data, among the I2C data frames.

For example, the control logic circuit
may identify the display sink to which the auxiliary data is requested from the device address, and
may identify the auxiliary data requested from the address information of an extended display identification data read-only memory (EDID ROM) or a status control data channel (SCDC) register according to reading of the register address.

For example, the transmission of the auxiliary data according to the request for the auxiliary data from the display source and the response to the request may be performed by the I2C data frames transmitted on the DDC, the I2C data frames
may include, before and after a re-start bit, a subframe in a write mode preceding the re-start bit and a subframe in a read mode following the re-start bit, and
the control logic circuit
may determine whether the auxiliary data requested from the display source is transmittable from a device address and a register address of the subframe in the write mode.

For example, the control logic circuit, which has determined that the auxiliary data requested from the display source is transmittable,
may transmit an ACK signal as an ACK bit indicating whether the display sink receives the device address and the register address of the subframe in the write mode and may transmit the requested auxiliary data as data of the subframe in the read mode.

For example, the control logic circuit, which has determined that the auxiliary data requested from the display source is transmittable, may transmit an ACK signal as an ACK bit indicating whether the display sink receives the device address and the register address of the subframe in the write mode and the device address of the subframe in the read mode.

For example, the control logic circuit, which has determined that the auxiliary data requested from the display source is transmittable, may transmit an ACK signal as an ACK bit forming the I2C data frames and transmits the auxiliary data requested as data forming the I2C data frames.

For example, the control logic circuit, which has determined that the auxiliary data requested from the display source is non-transmittable, may transmit a no-acknowledgment (NACK) signal as an ACK bit forming the I2C data frames to re-request the auxiliary data from the display source to the display sink.

For example, the control logic circuit may store EDID information or SCDC register information as the auxiliary data related to rendering of the display sink and SCDC register information as the auxiliary data related to setting of the main channel.

For example, the auxiliary data related to the settings of the main channel may include information about a link rate or a number of lanes set for the main channel by link training that checks whether a training pattern is transmitted from the display source and whether the transmitted training pattern is received.

For example, the auxiliary data related to the settings of the main channel may include information about pre-emphasis or de-emphasis related to channel equalization set for the main channel by link training that checks whether a training pattern is transmitted from the display source and whether the transmitted training pattern is received.

For example, the HDMI system may support a transition minimized differential signaling (TMDS) mode and a fixed rate link (FRL) mode.

For example, the control logic circuit may store the auxiliary data transmitted via the DDC between the display source and display sink and updates the auxiliary data with latest information close to a time when the main data including the image information is transmitted.

For example, the control logic circuit, after the main data including the image signal is transmitted via the main channel set from hand shaking or link training in an initial operation between the display source and display sink, may be involved in transmission of the auxiliary data according to the request for the auxiliary data from the display source and the response to the request as the display sink, in which a connection status has been changed, is reconnected normally, and may transmit the stored auxiliary data to the display source in response to the requested auxiliary data.

For example, the optical link may further include a hot plug detection (HPD) line for transmitting a hot plug signal from the display sink, wherein the control logic circuit may transmit the stored auxiliary data to the display source in response to the requested auxiliary data when the hot plug signal is recovered by normal reconnection of the display sink after a change in the hot plug signal according to the connection status of the display sink.

For example, as the hot plug signal is recovered by the normal reconnection of the display sink after the change in the hot plug signal according to the connection status of the display sink, the display source may transmit the main data including the image information, immediately after the normal reconnection of the display sink according to EDID information or SCDC register information before the change in the hot plug signal transmitted from the control logic circuit.

Figure 2:
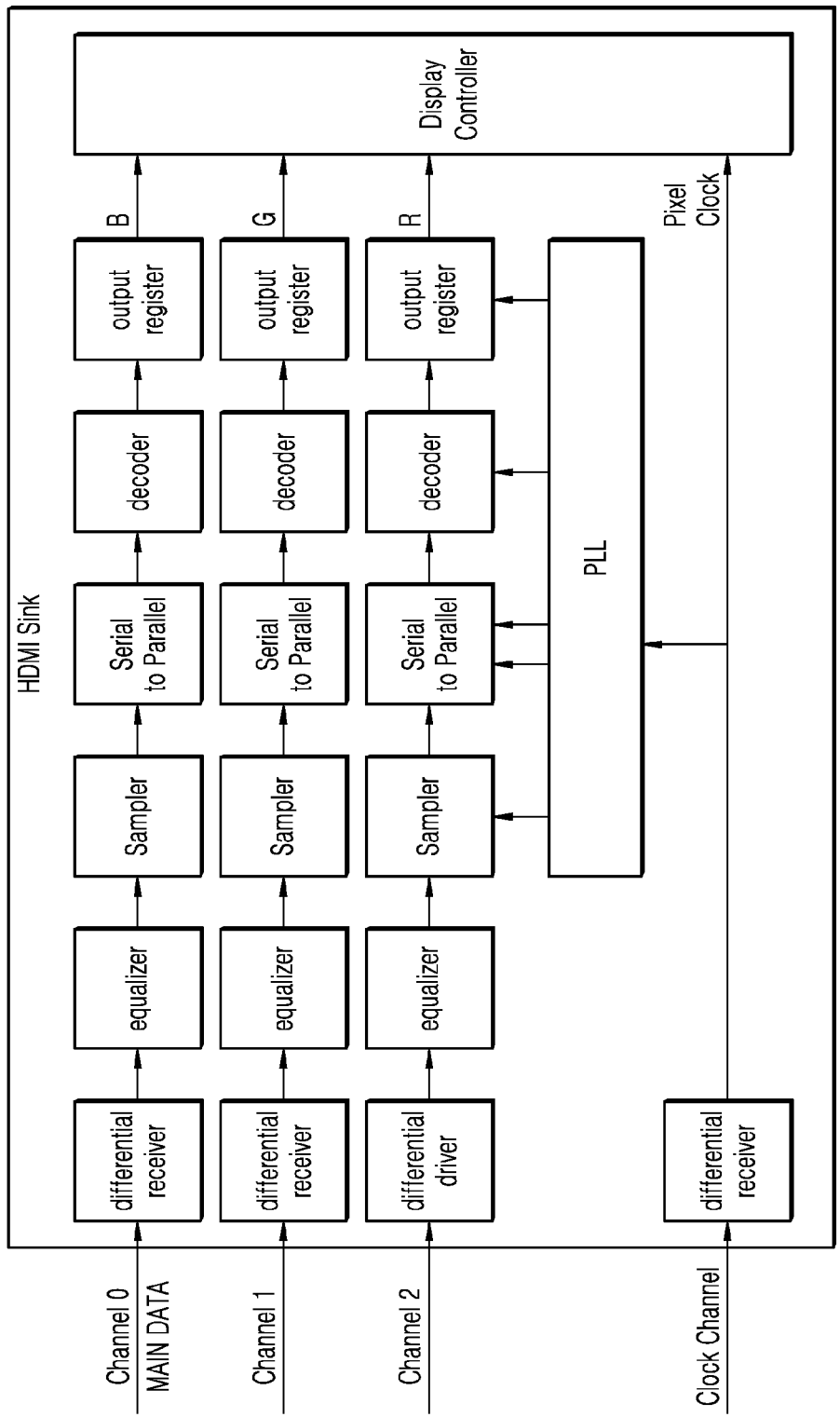
FIG. 2 shows a block diagram showing the configuration of a HDMI sink that constitutes the HDMI system.
Figure 3:
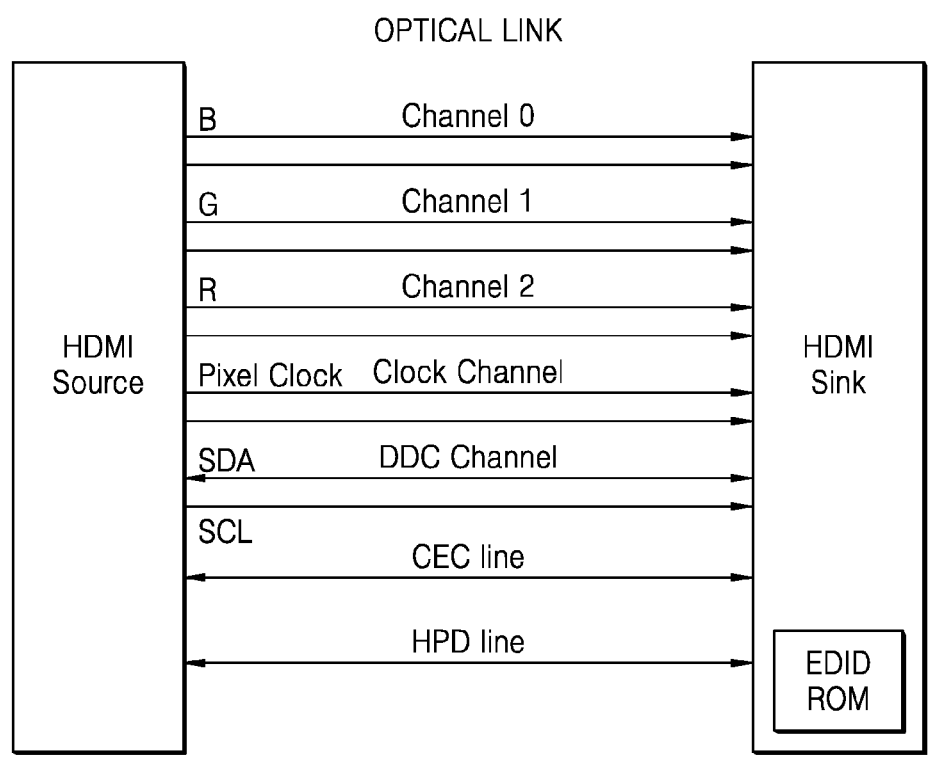
FIG. 3 shows a diagram showing the configuration of an optical link that mediates signal transmission between the display source and the display sink.

FIG. 1 shows a block diagram showing the configuration of a display source that constitutes a HDMI system. FIG. 2 shows a block diagram showing the configuration of a display sink that constitutes the HDMI system. FIG. 3 shows a diagram showing the configuration of an optical link that mediates signal transmission between the display source and the display sink.

Referring to FIGS. 1 to 3, the HDMI system may include the display source and the display sink that are connected to each other by an optical link and transmit and receive main data and auxiliary data.

The display source may include an input register that receives main data from a graphic controller, an encoder that encodes the main data output from the input register according to a parallel clock signal, and a shift register (or serializer, parallel to serial) by which a parallel signal of main data input according to the parallel clock signal is output as a serial signal according to a serial clock signal. The encoder may perform line encoding and block encoding on the main data, achieve DC balance between positive voltage and negative voltage to prevent signal distortion due to a DC component, and perform appropriate line encoding by considering synchronization between the display source and the display sink. In addition, the encoder may convert, for example, an 8-bit input into a 10-bit output by the block encoding, achieve the DC balance between the positive voltage and the negative voltage by the block encoding, and check data transmission errors (bit errors). For example, the input register, the encoder, and the shift register (parallel to serial) may be synchronized with each other by using a parallel clock as an input, and the parallel clock may be output via a frequency multiplier or a phase lock loop (PLL) that inputs a pixel clock. The shift register (parallel to serial) may output the main data of a serial signal by using, as an input, a high-frequency serial clock, which is output via the frequency multiplier or the PLL that inputs the pixel clock. For example, the serial clock may be output at a bit rate corresponding to a multiple of the parallel clock.

The display source may include a scrambler connected to the rear of the graphic controller, and the scrambler may prevent a low signal and a high signal from coming in succession so as not to lose synchronization at the display sink and achieve the DC balance between the positive voltage and the negative voltage.

Figure 4:
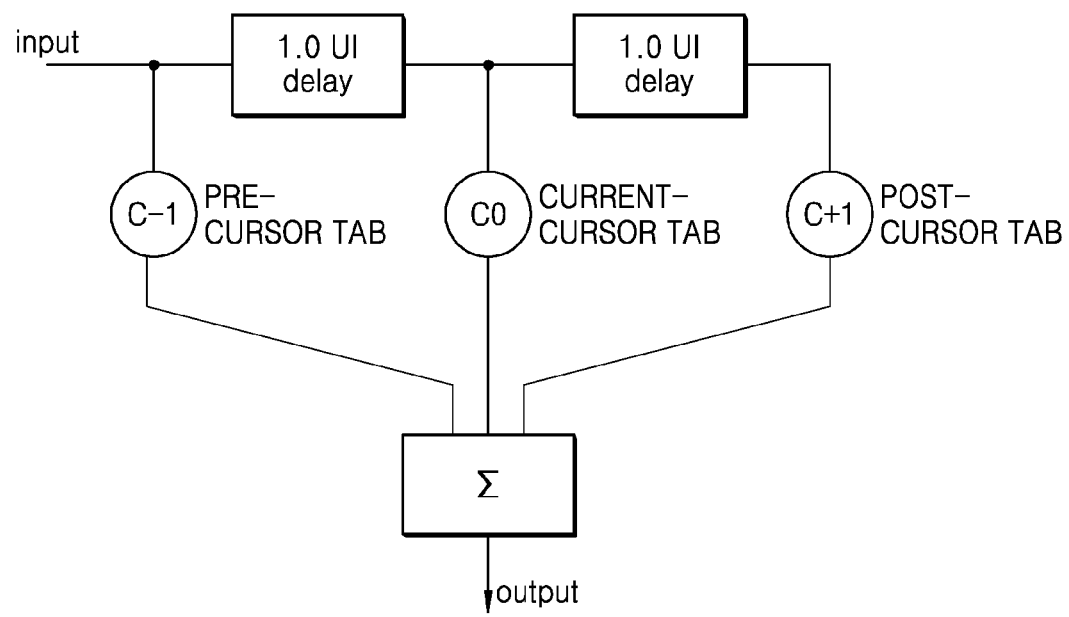
FIG. 4 is a diagram schematically showing a finite impulse response (FIR) filter as an example of an equalizer according to an embodiment.

FIG. 4 is a diagram schematically showing a finite impulse response (FIR) filter as an example of the equalizer according to an embodiment.

Figure 5:
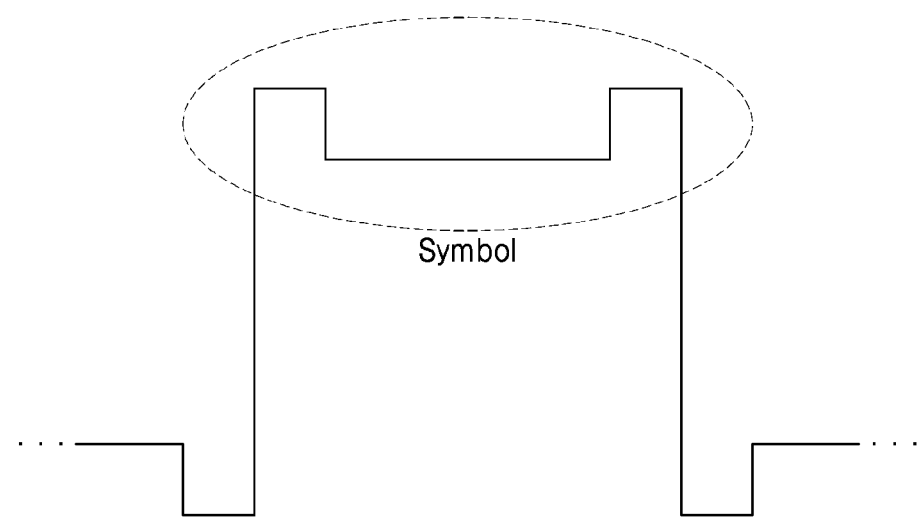
FIG. 5 is a diagram schematically showing pre-emphasis or de-emphasis formed before and after a symbol by the equalizer according to an embodiment.

FIG. 5 is a diagram schematically showing pre-emphasis or de-emphasis formed before and after a symbol by the equalizer according to an embodiment.

The display source may include the equalizer (feed forward equalization (FFE)) connected to the rear of the shift register (or serializer, parallel to serial). The equalizer (FFE) is also referred to as the pre-emphasis or de-emphasis and intended to solve the limitation of high-speed serial link, in which a signal peak is attenuated and a signal width is spread out due to distortion of a transmission signal, an Inter symbol interference (ISI), delay distribution, and impedance mismatch, making it difficult to detect a signal at a receiving end. The spread of the pulse width is taken into consideration in a manner in which the input signal is delayed by IUI (Unit Interval), inverted, and then weighted values (C−1, C0, C+1) are applied to this input signal, and the resulting signal is added to the original input signal. For example, according to an embodiment, the equalizer may include a 3-tap FIR filter of the pre-cursor tab (C−1), post-cursor tab (C+1), and current-cursor tab (C0), which process pre-cursor ISI, post-cursor ISI, and current-cursor ISI, respectively. The equalizer may predict a loss occurring in a high-speed link and intentionally generate a distorted signal to include an appropriate amount of pre-emphasis or de-emphasis.

Figure 6:
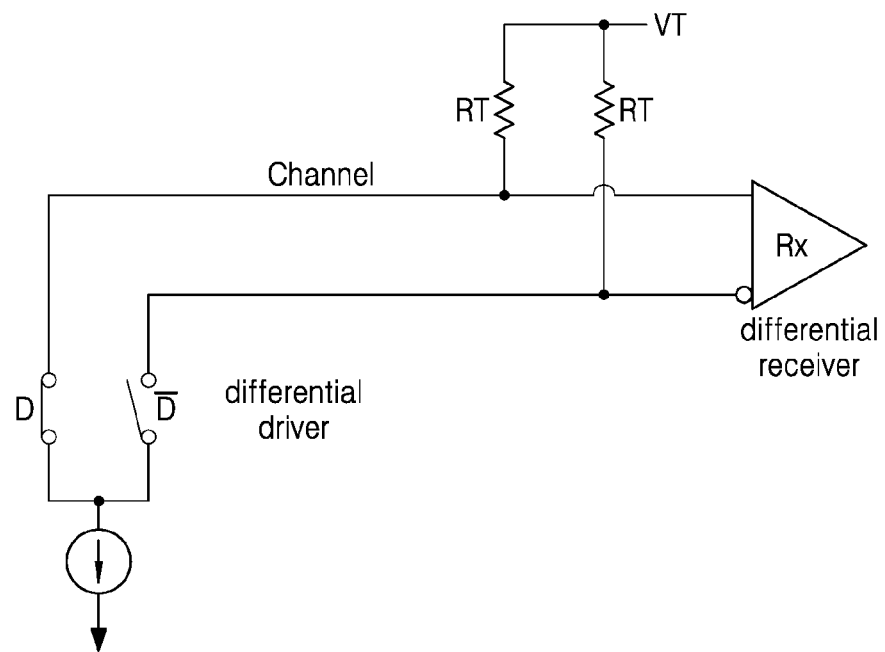
FIGS. 6 and 7 respectively show examples of a differential driver and a differential receiver according to an embodiment.
Figure 7:
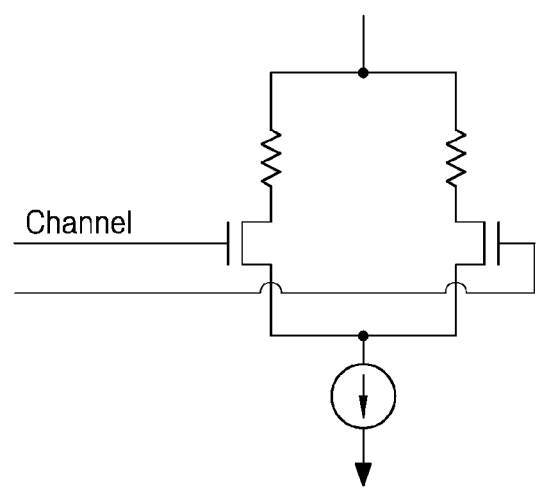

FIGS. 6 and 7 respectively show examples of a differential driver and a differential receiver according to an embodiment. For reference, FIG. 6 is a diagram showing the overall main channel that includes a differential driver.

Referring to FIGS. 1 and 6, the differential driver may be connected to the rear end of the equalizer (FFE). The differential driver receives a single ended signal as an input and outputs a differential signal. The differential driver transmits the main data transmitted via the main channel as a differential signal and may thereby cancel out noise interfering with the main data signal by using common mode voltage. In an embodiment, the differential driver may include a pair of switches D and D bar through which control signals inverted with respect to each other are input. Also, the differential driver may include a current source that is connected in series to the pair of switches D and D bar for a constant differential output in which the effect of common mode voltage is canceled out. Each switch may be connected to a termination supply voltage VT via a termination resistor as a pull-up resistor RT. A differential signal connected to the termination supply voltage VT (e.g., 3.3 V) via the same termination resistor RT (e.g. 50Ω) and having a positive bias voltage or common mode voltage may be transmitted via the main channel.

Referring to FIGS. 2 and 7, the display sink may include a differential receiver that receives main data of the differential signal received via the main channel and outputs the main data of the single ended signal. In an embodiment, the differential receiver may include a differential amplifier and output the main data of the differential signal transmitted via the main channel as the main data of the single ended signal.

Referring to FIG. 2, an equalizer may be connected to the rear end of the differential receiver. In an embodiment, the equalizer of a low-pass filter may be connected thereto, and a linear low-pass filter, such as continuous time linear equalization (CTLE), may be applied to amplify high-frequency components of the main data. A sampler may be connected to the rear of the equalizer. The sampler uses the clock signal output via a frequency multiplier or PLL having a pixel clock as an input and quantizes the main data signal into binarized data of a low signal or a high signal.

The display sink may include a shift register (or deserializer, serial to parallel) that is connected to the rear end of the sampler to sequentially receive serial signals of main data according to a serial clock and output parallel signals of main data according to a parallel clock, a decoder that decodes the main data output from the shift register (serial to parallel), and an output register that outputs the decoded main data to a display controller according to the parallel clock. The decoder may match the encoder on the transmission side and perform inverse transformation, such as line encoding and block encoding by the encoder, and may thus convert, for example, 10 bits of main data into 8 bits of main data. For example, the shift register (serial to parallel) may use a clock signal, which uses a pixel clock as an input and is output via a frequency multiplier or PLL, as a serial clock and may receive main data sequentially. The shift register (serial to parallel), the decoder, and the output register may be synchronized with each other by using the parallel clock as an input. For example, the parallel clock may be generated via a frequency conversion circuit, such as the PLL, by using a pixel clock as an input. Also, according to various embodiments, the display sink may further include a descrambler that matches the scrambler on the display source.

Referring to FIG. 3, the main channel connected between the display source and the display sink may transmit main data. The main channel may transmit the main data in one direction from the display source to the display sink. In an embodiment, the main channel of a high-definition multimedia interface (HDMI) is similar to low voltage differential signaling (LVDS) in that the main channel uses differential signals to reduce electromagnetic interference (EMI), but may transmit the main data using transition minimized differential signaling (TMDS) signal, which is different from LVDS. For example, in the LVDS, the signal line carrying the differential signal may be terminated on the transmission side. However, in the TMDS, the signal line (main channel) carrying the differential signal may be terminated on the reception side.

The main channel of the HDMI may transmit the main data including image data, audio data, and pixel clock data and may include four main channels, each containing a twisted pair. For example, the main channel may include a total of four main channels, such as, 3 main channels (Channel 0, Channel 1, Channel 2) for transmitting image data of red, green, and blue (RGB) or luminance, chrominance-blue, and chrominance-red (YCbCr) and 1 main channel (Clock Channel) for the pixel clock. More specifically, the main channels may include a 0-th main channel Channel 0 that transmits B data, a first main channel Channel 1 that transmits G data, a second main channel Channel 2 that transmits R data, and a third main channel Clock Channel for transmitting the pixel clock. The main data transmitted via the main channel may further include audio data, a horizontal synchronization signal, and a vertical synchronization signal, along with the image data and the pixel clock. For example, the 0-th main channel Channel 0 may transmit the horizontal synchronization signal and the vertical synchronization signal together with B data, and may transmit audio header data along with the horizontal synchronization signal during the period of the horizontal synchronization signal. The first and second main channels Channel 1 and Channel 2 may transmit audio data during the same period.

Figure 8:
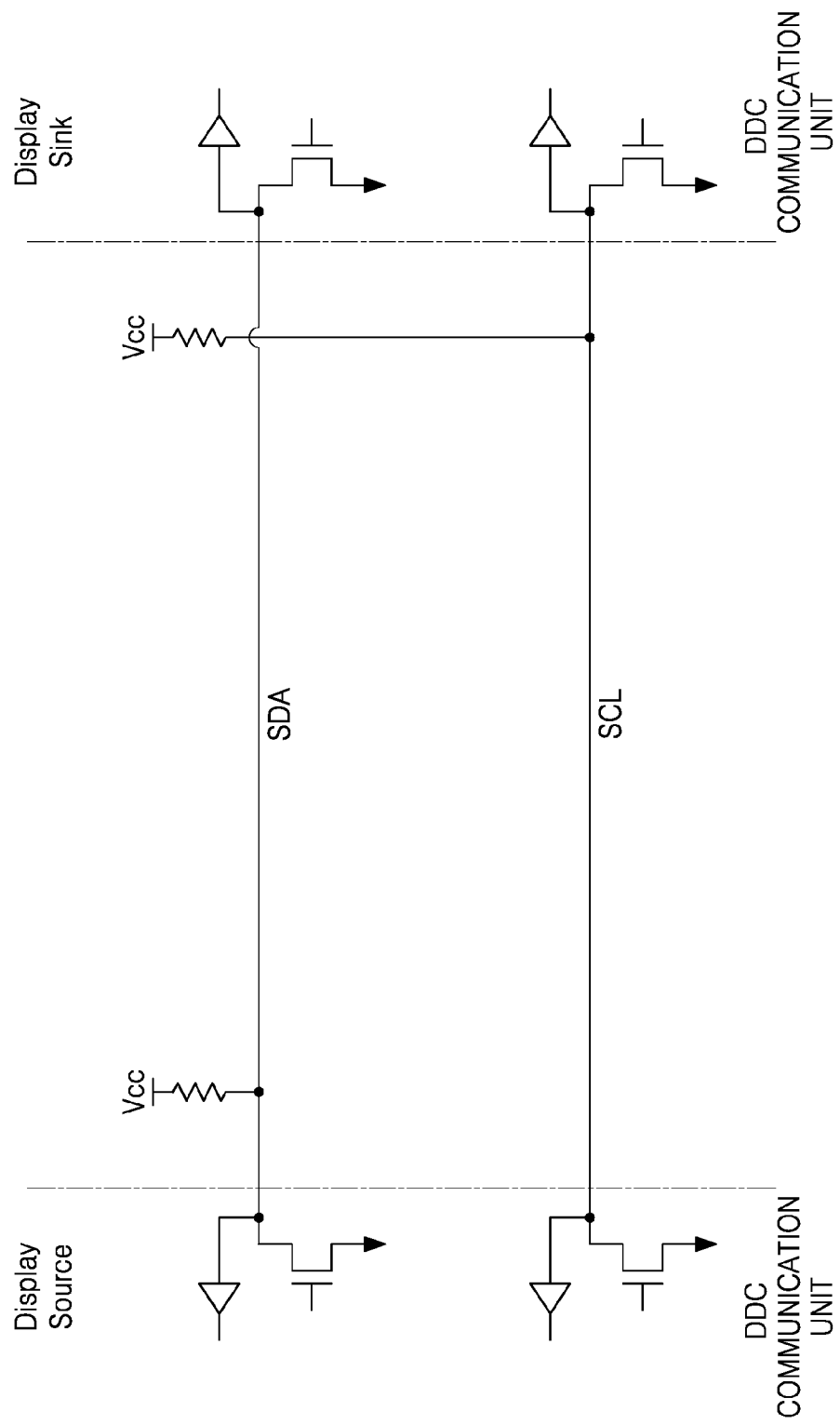
FIG. 8 shows a diagram showing an example of a display data channel (DDC)

FIG. 8 shows a diagram showing an example of a display data channel (DDC).

The DDC for transmission of auxiliary data to set or manage the main channel may be connected between the display source and the display sink. The components of the display source and the display sink described above are connected to the main channel for transmitting the main data. Hereinafter, components of the display source and the display sink connected to the DDC through which the auxiliary data is transmitted are described.

The DDC includes a communication channel based on an inter-integrated circuit (I2C) bus, through which the auxiliary data may be transmitted for the display source to find device information of the display sink. Unlike the main channel, the DDC may transmit the auxiliary data in both directions between the display source and the display sink. For example, the EDID information of the display sink as the device information of the display sink may be obtained via the DDC to thereby check rendering-related data, such as the resolution and scan rate of the display sink. Also, public keys of high bandwidth digital content protection (HDCP) may be exchanged to check protection-related functions of video contents.

The DDC is based on the I2C bus and may include a clock line SCL for synchronization between the display source and the display sink and a data line SDA containing data. Here, clock lines SCL of the display source and the display sink may be connected to each other and linked to the Vcc voltage via a pull-up resistor. Similarly, the data lines SDA of the display source and the display sink may also be connected to each other and linked to the Vcc voltage via a pull-up resistor. Accordingly, the data line SDA may maintain a high signal using the pull-up resistor before the auxiliary data (or a data frame in which auxiliary data is processed) is transmitted. When the transmission side of either the display source or the display sink converts the data line SDA, which was maintained as the high signal, to a low signal so as to transmit the auxiliary data, the transmission of the auxiliary data may be initiated.

Figure 9:
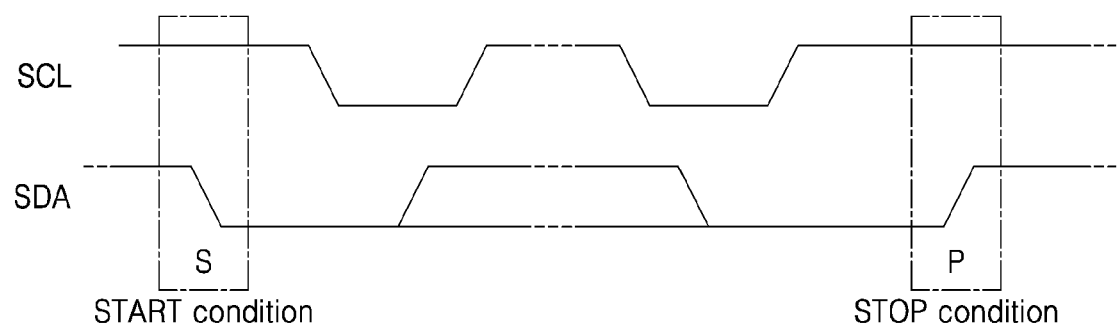
FIG. 9 shows a diagram illustrating a start signal and a stop signal used as a communication start signal and a communication end signal, respectively, of the DDC.

FIG. 9 shows a diagram illustrating a start signal S and a stop signal P used as a communication start signal and a communication end signal, respectively, of the DDC.

Figure 10:
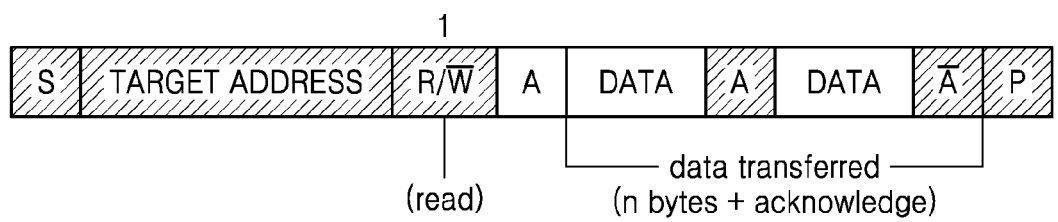
FIG. 10 shows a diagram showing a data frame of the DDC between the display source and the display sink.
Figure 10:
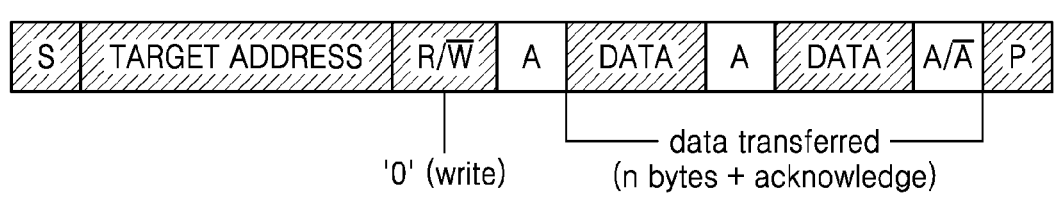

FIG. 10 shows a diagram showing a data frame of the DDC between the display source and the display sink.

Referring to FIGS. 9 and 10, the start of transmission of the auxiliary data may be detected from a 1-bit start signal S in which the data line SDA transitions from a high signal to a low signal while the clock line SCL maintains the high signal (START condition). Also, the data line SDA may maintain a high signal using the pull-up resistor after the auxiliary data (or a data frame in which auxiliary data is processed) is transmitted. When the transmission side of either the display source or the display sink returns the data line SDA to the high signal so as to terminate the transmission, the transmission of the auxiliary data may be terminated. More specifically, the end of transmission of the auxiliary data may be detected from a 1-bit stop signal P in which the data line SDA transitions from the low signal to the high signal while the clock line SCL maintains the high signal (STOP condition).

The data frame of the auxiliary data transmitted via the DDC may include the start signal S to the stop signal P. For example, the data frame may include 8 bits of data that is obtained by adding 7 bits for address data of the destination connected after the start signal S and 1 bit R/W signal for "read (high signal)" or "write (low signal)" following the address data. The address data and R/W signal may be followed by a 1-bit ACK signal (ACK: acknowledgment, low signal, NACK: no-acknowledgment, high signal), and the 1-bit ACK signal is related to confirming reception from either the display sink or the display source corresponding to the destination of the address data. For example, the transmission side receives the ACK signal from the reception side and then transmits data, and the reception side transmits the ACK signal for confirming receipt of data. In this manner, with a repeating pattern of data and ACK signals, communication may be established between the transmission side and the reception side by the DDC. Also, the data and ACK signals may be alternately repeated until a stop signal P indicates the end of transmission.

For example, at least one of the display source and the display sink may exchange control of communication according to the start signal S and the stop signal P as described above, in a network corresponding to a plurality of devices, in which one-to-many, many-to-one, or many-to-many devices participate. For example, in one embodiment, the start signal S and the stop signal P may be detected by the START condition and the STOP condition, respectively, in which the data line SDA transitions between the high signal and the low signal, while the clock line SCL remains at the high signal. The START condition and STOP condition described above, in which the data line SDA transitions while the clock line SCL is maintained at the high signal, are exceptional rules. In data transmission sections other than the START condition or the STOP condition, the transition of the data line SDA occurs when the clock line SCL is the low signal, not the high signal. As the transition of the data line SDA occurs at the low signal of the clock line SCL, it is possible to set stable data that may be sampled on the data line SDA from the high signal of the clock line SCL. In other words, the exceptional condition, in which the data line SDA transitions while the clock line SCL maintains the high signal, may correspond to the start condition START condition and the stop condition STOP condition of the data frame. Throughout this specification, the transition of the data line SDA may refer to a falling edge transitioning from the high signal to the low signal or a rising edge transitioning from the low signal to the high signal. In other words, the START condition occurs at the falling edge of the data line SDA while the clock line SCL is at the high signal and the STOP condition occurs at the rising edge of the data line SDA while the clock line SCL is at the high signal. For the sections, in which data is transmitted, other than the exceptional rules of START condition and STOP condition as described above, the falling edge or rising edge of the data line SDA may occur when the clock line SCL is at the low signal. Since the falling edge or rising edge of the data line SDA occurs when the clock line SCL is at the low signal, sampling may be performed on the data line SDA in a state in which the clock line SCL is at the high signal and the data after the falling edge or rising edge is set stably.

In an embodiment, the display source and the display sink may include DDC communication units connected to the data line SDA, and the DDC communication unit of each of the display source and the display sink may include a bipolar junction transistor (BJT) of an open collector or a field effect transistor (FET) of an open drain, which are connected to each other via the data line SDA, and provide transistor transistor logic (TTL) communication. The collector or drain side of the transistor may be connected to the Vcc voltage via a pull-up resistor connected to the data line SDA and the emitter or source side of the transistor may be connected to ground. When a high control signal is applied to the DDC communication unit of any one of the display source and the display sink, the data line SDA may output the low signal (see FIG. 8).

Referring to FIG. 3, the HDMI system may include the main channel for data transmission and the DDC for control/management of the main channel and other devices. In an embodiment, the HDMI may further include a hot plug detection (HPD) line for supporting a hot plug function and a consumer electronic control (CEC) line, in addition to the main channel and the DDC.

The HPD line may be configured to transmit a hot plug signal (hot plug detection (HPD) signal) in one direction from the display sink to the display source. The HPD line may be configured to transmit the HPD signal that includes a signal indicating that the display sink has detected cable connection and an interrupt request when the status of the display sink changes or the data is not received properly. In addition, the HDMI system may further include a 5V power supply line, and the 5V power supply line may supply power to the display sink so that rendering data, such as EDID, is read even when the display sink is not powered.

In one embodiment, the HDMI may further include a CEC line, and the CEC line is for integrated control of multiple devices on the HDMI CEC network and may correspond to an electronic control passage for controlling interaction on the network.

Figure 11:
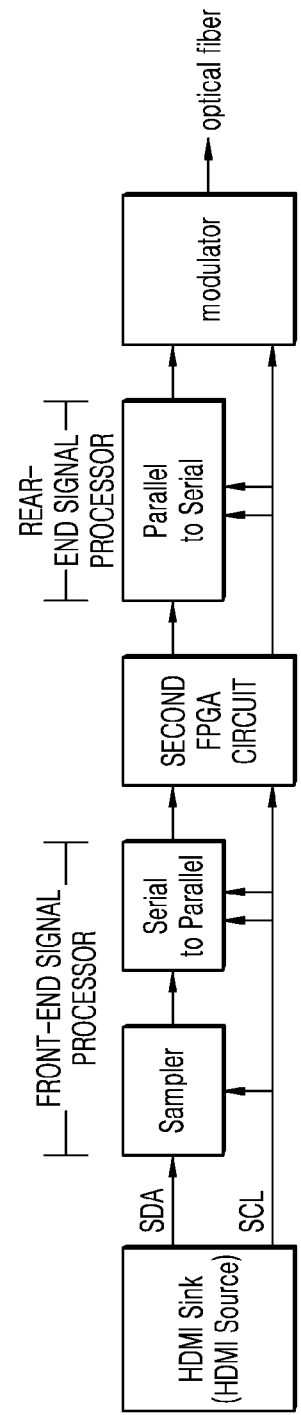
FIGS. 11 and 12 are diagrams showing an example of the DDC according to an embodiment and illustrate configurations of the display source and the display sink, respectively.
Figure 12:
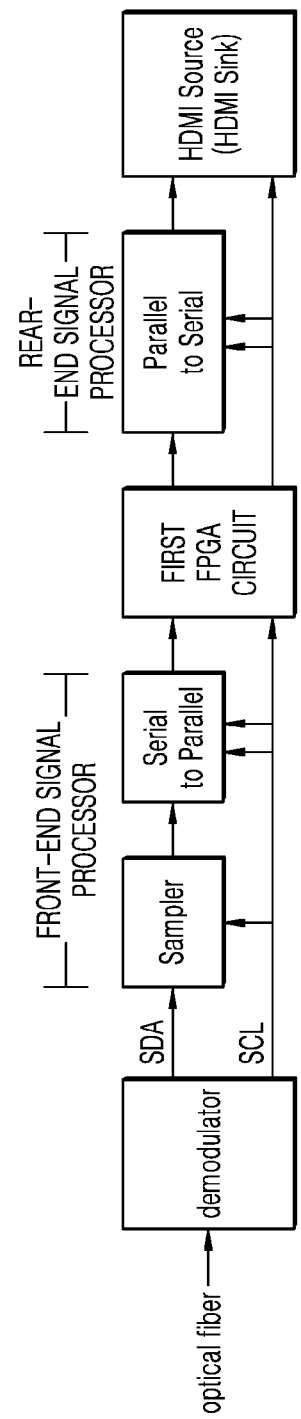

FIGS. 11 and 12 are diagrams showing an example of the DDC according to an embodiment and illustrate configurations of the display source and the display sink, respectively.

Referring to FIGS. 3, 11 and 12, in one embodiment, the optical link may be provided between the display source and the display sink so as to relay data communication therebetween. The optical link may constitute the main channel and the DDC between the display source and the display sink. The optical link may include optical cables for transmitting the main data and the auxiliary data and provide optical communication between the display source and the display sink. The optical link may include photoelectric converters at both ends, including a modulator that uses an electrical signal as an input and outputs an optical signal, and conversely, a demodulator that uses an optical signal as an input and outputs an electrical signal. The optical link may include an optical cable connecting the photoelectric converters to each other. Here, the photoelectric converters may include first and second photoelectric converters, which are provided adjacent to the display source and the display sink, respectively. The first photoelectric converter may be connected to the display source via a conductive line at a location adjacent to the display source and the second photoelectric converter may be connected to the display sink via a conductive line at a location adjacent to the display sink.

The main data transmitted via the main channel may be converted into an optical signal by the first photoelectric converter, then transmitted via the optical cable, and converted back into an electrical signal by the second photoelectric converter. Similarly, the auxiliary data transmitted via the DDC may also be converted into an optical signal by the first photoelectric converter, then transmitted via the optical cable, and converted back into an electrical signal by the second photoelectric converter.

In an embodiment, a field programmable gate array (FPGA) circuit may be connected to the DDC of the optical link. In an embodiment, the FPGA circuit may not be connected to the main channel but selectively connected only to the DDC. The FPGA circuit may include a first FPGA circuit connected adjacent to the display source and a second FPGA circuit connected adjacent to the display sink, and the main data may be transmitted from the display source to the display sink while bypassing the FPGA circuit without passing through the FPGA circuit.

Figure 13:
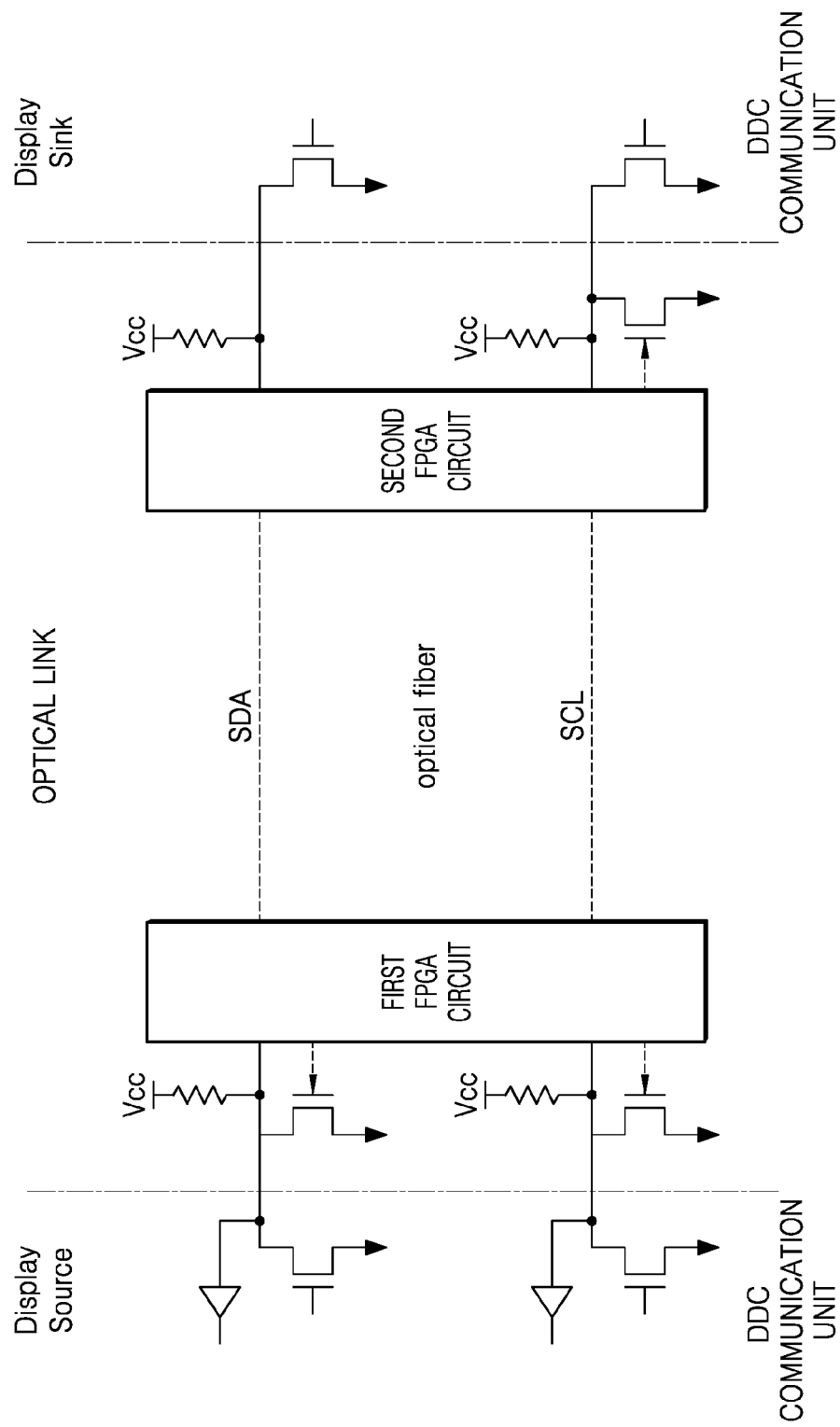
FIG. 13 is a diagram illustrating the operation of a field programmable gate array (FPGA) circuit for preventing data transmission errors by the DDC, according to an embodiment.

FIG. 13 is a diagram illustrating the operation of the FPGA circuit for preventing data transmission errors by the DDC, according to an embodiment.

Figure 14:
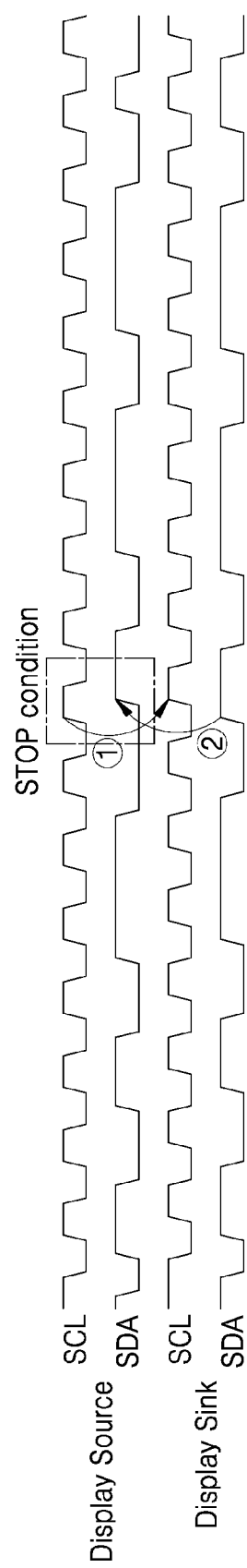
FIG. 14 is a diagram showing signals of a clock line and a data line of each of the display source and the display sink to explain data transmission errors by the DDC.

FIG. 14 is a diagram showing signals of the clock line SCL and the data line SDA of each of the display source and the display sink to explain data transmission errors by the DDC.

Figure 15:
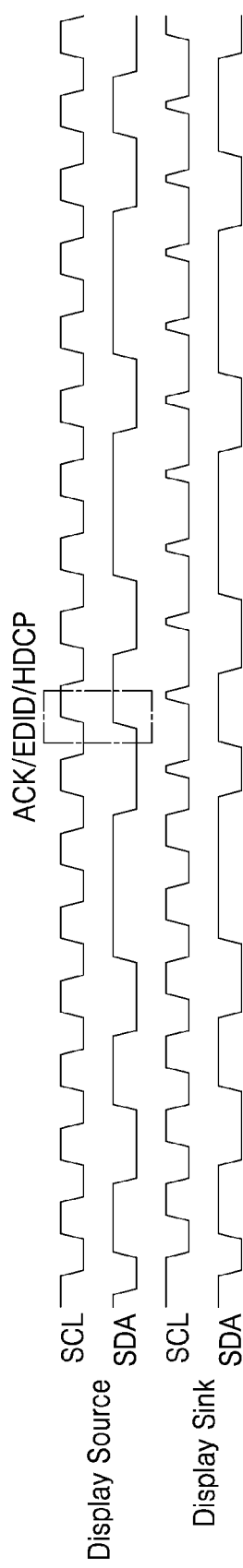
FIG. 15 shows a diagram showing a state in which the signal of the clock line on the display source is adjusted to prevent data transmission errors, according to an embodiment.

FIG. 15 shows a diagram showing a state in which the signal of the clock line on the display source is adjusted to prevent data transmission errors, according to an embodiment.

Figure 16:
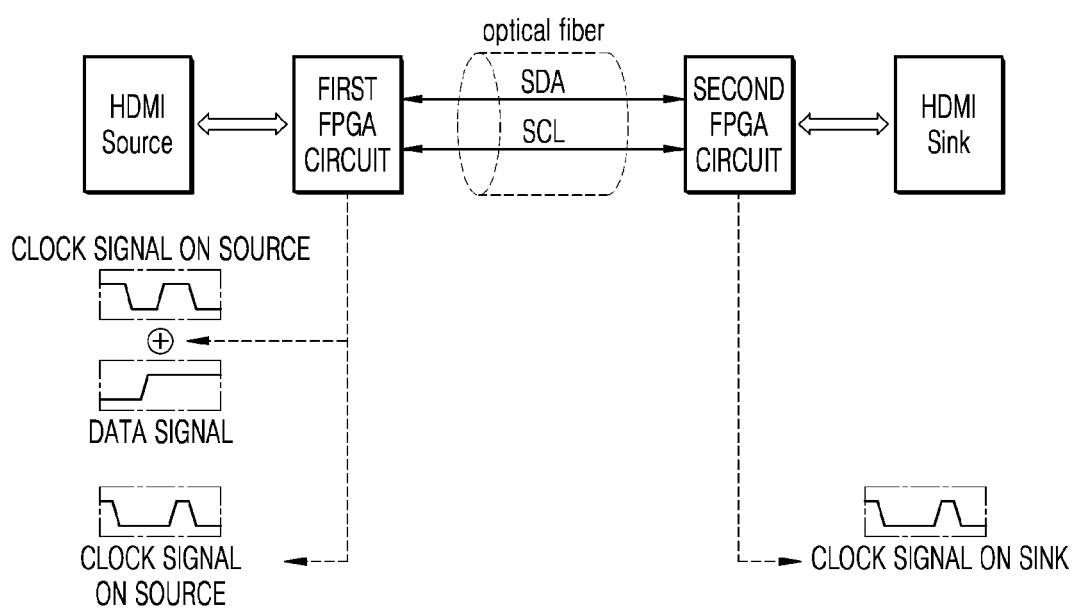
FIG. 16 schematically shows the operation of a first FPGA circuit of an optical link adjacent to the display source and a second FPGA circuit of an optical link adjacent to the display sink, to prevent data transmission errors, according to various embodiments.

FIG. 16 schematically shows the operation of the first FPGA circuit of the optical link adjacent to the display source and the second FPGA circuit of the optical link adjacent to the display sink, to prevent data transmission errors according to various embodiments.

Referring to FIG. 13, the FPGA circuit may store the auxiliary data transmitted from the display sink or adjust the clock signal transmitted via the clock line SCL, in order to prevent transmission errors in which the STOP condition occurs during data transmission due to synchronization failure between the data line SDA and clock line SCL that constitute the DDC.

In an embodiment, the FPGA circuit stores data transmitted from the display sink. For example, the FPGA circuit may store data transmitted from the display sink, such as the EDID data related to the rendering of the display sink and the HDCP data for exchanging the HDCP public keys at regular intervals so as to protect digital contents. The FPGA circuit may store these pieces of data and transmit the stored data to the display source so as to match the clock signal of the display source. For example, in an embodiment, the clock line SCL of the DDC may transmit the clock signal for synchronization between the display source and the display sink. Depending on the low/high state of the clock line SCL at which the rising edge of the data line SDA is captured, the rising edge of the data line SDA may be interpreted as data intended to transmit information, such as the ACK signal, the EDID data, or the HDCP data or interpreted as the STOP condition representing the end of the corresponding transmission. For example, the rising edge of the data line SDA captured in the low state of the clock line SCL may be interpreted as data intended to transmit general information and may be interpreted as a high signal in which a stable setting is formed in the high state of the clock line SCL. On the other hand, the rising edge of the data line SDA captured in the high state of the clock line SCL may be interpreted as the STOP condition representing the end of transmission.

Referring to FIG. 14, in an embodiment, the display sink may transmit the ACK signal in response to a request from the display source or transmit requested data accompanying the ACK signal while transmitting the ACK signal in response to a request from the display source, so as to match the clock signal transmitted from the display source on the transmission side. Since the ACK signal from the display sink or the requested data accompanying the ACK signal corresponds to the transmission of data for the purpose of conveying information, the rising edge of the data line SDA needs to occur in the high state of the clock signal. However, the signal delays caused sequentially overlap with each other, that is, the first signal delay ① of the clock signal transmitted from the display source to the display sink overlaps with second signal delay ② of the ACK signal (or requested data accompanying the ACK signal) transmitted from the display sink to the display source in match with a first signal delayed-clock signal. Accordingly, the display source matches the clock signal transmitted from the display source without signal delay and interprets the ACK signal (or the requested data accompanying the ACK signal) transmitted from the display sink having overlapping first and second signal delays ① and ②. For this reason, the display source, which interprets the ACK signal in which the first and second signal delays ① and ② have occurred in match with a clock signal having no signal delay, may operate differently from the original intention of the display sink that has transmitted the ACK signal depending on the relative signal delay between the clock signal and the ACK signal. The rising edge of the ACK signal does not match the low state of the clock signal, but matches the high state of the clock signal due to the signal delay (the first and second signal delays ① and ② of the ACK signal and may be interpreted as the STOP condition informing of the end of transmission, rather than data transmission for the purpose of information transmission.

The data transmission errors between the display source and the display sink may be caused by interpreting the ACK signal in which the first and second signal delays ① and ② are accumulated, when the first and second signal delays ① and ② of the ACK signal transmitted from the display sink are accumulated and the clock signal having no signal delay is matched in the display source. Unlike signal delays that typically occur in one direction, the data transmission errors described above are caused by the accumulation of the first and second signal delays ① and ② that occur while traveling back and forth between the display source and the display sink. More specifically, as a result of the accumulation of the first signal delay (①, delay of the clock signal) caused in one direction from the display source to the display sink and the second signal delay (②, delay of ACK signal) caused in one direction from display sink to display source, there is a high probability that, for the display source, data transmission errors occur in the process of matching clock signals having no signal delay and interpreting the ACK signals having the first and second signal delays ① and ②. For example, compared to typical unidirectional data transmission, it may be understood that the probability that a data transmission error occurs is relatively high. For example, in unidirectional data transmission, a delayed signal transmitted from the display source is matched with a delayed clock signal so as to interpret a delayed data signal transmitted from the same display source. For this reason, as described above, the data transmission error in unidirectional data transmission is different from the data transmission error that occurs as the first and second signal delays ① and ② accumulate while traveling back and forth between the display source and the display sink. In practice, it can be understood that the unidirectional data transmission does not have a large possibility of data transmission error.

In an embodiment, in order to prevent transmission errors in the auxiliary data transmitted via the DDC as the first and second signal delays ① and ② accumulate while traveling back and forth between the display source and the display sink, the data transmitted from the display sink is stored by the FPGA circuit of the optical link, and the stored data may be transmitted to the display source in match with the clock signal of the display source having no signal delay. In an embodiment, the data from the display sink, which is stored by the FPGA circuit, may include data for the purpose of information transmission, including the ACK signal for a request from the display source and data requested from the display source, for example, the EDID data and HDCP data. The FPGA circuit matches the clock signal having no signal delay from the display source and transmits the ACK signal and the data (EDID and HDCP data) requested from the display source. As a result, for the display source, the rising edge of data signal and the ACK signal may be interpreted in match with the low state of the clock signal. Accordingly, the ACK signal and data signal are matched with the high signal of the clock signal according to the first and second signal delays ① and ②, and thus, contrary to the original intention of the display sink, data transmission errors that are interpreted as the STOP condition different from the ACK signal and data signal may be prevented.

Referring to FIGS. 11 and 12, in one embodiment, the optical link may include an FPGA circuit that reads auxiliary data transmitted between the display source and the display sink, stores contents of the auxiliary data, matches the stored auxiliary data to a clock signal having no signal delay from the display source and transmits the resulting data. The optical link may include a front-end signal processor and a rear-end signal processor before and after the FPGA circuit. In an embodiment, the meanings of terms, such as "front end" and "rear end", are based on the signal transmission direction and refer to the forward and rearward directions with respect to the FPGA circuit, such as "front" and "back." In particular, these terms may not limit the connection locations of the signal processor. For example, the optical link may include a front-end signal processor, a second FPGA circuit, and a rear-end signal processor, which are components connected adjacent to the display sink and arranged in the direction of the response signal transmitted from the display sink. Similarly, the optical link may include a front-end signal processor, a first FPGA circuit, and a rear-end signal processor, which are components connected adjacent to the display source and arranged in the direction of the response signal transmitted from the display sink. FIGS. 11 and 12 show the configuration for processing the response signal transmitted from the display sink. The configuration for processing the request signal transmitted from the display source may be formed in the reverse order as shown in FIGS. 11 and 12.

Referring to FIGS. 11 and 12, in one embodiment, the front-end signal processor may include a sampler that quantizes the data signal input via the data line SDA into low and high binary data using the clock signal input via the clock line SCL and a shift register (or deserializer, serial to parallel) that is connected to the rear end of the sampler, sequentially inputs serial signals of auxiliary data according to the clock signal, and outputs parallel signals of auxiliary data according to the parallel clock. For example, the shift register (serial to parallel) may sequentially receive the auxiliary data by using the clock signal transmitted via the clock line SCL as the serial clock, generate the parallel clock using the clock signal transmitted through the clock line SCL, and generate the parallel clock via a circuit for frequency conversion, such as the PLL. For example, in an embodiment, the PLL may generate the clock signal to quantize the data signal input via the data line SDA into the low and high binary data, using the clock signal transmitted via the clock line SCL as an input, or generate the parallel clock input to the shift register (serial to parallel).

The FPGA circuit may read the auxiliary data of the parallel signal output from the shift register (serial to parallel). For example, depending on the contents of the corresponding auxiliary data, the FPGA circuit may determine whether the data from the display sink includes the data for the purpose of transmitting information, such as the ACK signal, the EDID data, the HDCP data or includes the data corresponding to the stop condition for informing of the end of transmission (e.g., a stop signal P). When the data from the display sink includes data for the purpose of transmitting the information, such as the ACK signal, the EDID data, and the HDCP data, this data is stored and matched with the clock signal output from the display source, and then the stored data may be transmitted to the display source.

The rear-end signal processor may be connected to the rear end of the FPGA circuit. The rear-end signal processor may include a shift register (or serializer, parallel to serial) that outputs the parallel signal of the auxiliary data input according to the parallel clock as the serial signal according to the clock signal transmitted via the clock line SCL. For example, in an embodiment, the shift register (parallel to serial) may use the clock signal transmitted via the clock line SCL as an input and may output the serial signal using the parallel signal output from the FPGA circuit as an input, depending on the parallel clock or serial clock output from the PLL.

Depending on the contents of the corresponding auxiliary data, the FPGA circuit may determine whether the data from the display sink includes the data for the purpose of transmitting information, such as the ACK signal, the EDID data, the HDCP data or includes the data corresponding to the stop condition for informing of the end of transmission (e.g., a stop signal P). When the data from the display sink includes data for the purpose of transmitting the information, such as the ACK signal, the EDID data, and the HDCP data, this data is stored and matched with the clock signal output from the display source, and then the stored data may be transmitted to the display source. For example, the FPGA circuit may transmit stored data to the display source in match with the stored data to the clock signal of the display source, so that the rising edge of data for the purpose of transmitting the information, such as the ACK signal, the EDID data, and the HDCP data, transmitted from the display sink matches the low signal of the clock signal of the display source and does not match the high signal.

In an embodiment, the optical link may include the first FPGA circuit connected adjacent to the display source and the second FPGA circuit connected adjacent to the display sink, and the storage of data transmitted from the display sink and the transmission of the stored data as described above may be performed at any one location of the first and second FPGA circuits. However, in an embodiment, in order to receive the clock signal output from the display source without signal delay and transmit the stored data by matching the data to the clock signal having no signal delay, the first FPGA circuit connected to the location adjacent to the display source may store the data from the display sink and transmit the stored data to the display source. That is, in an embodiment, in order to match the stored data to the clock signal of the display source and transmit the matched data to the display source, that is, the first FPGA circuit connected to the location adjacent to the display source and advantageous for synchronization without signal delay of the clock signal may store data on the display sink, match the stored data to the clock signal on the display source, and transmit the matched data to the display source. In an embodiment, the clock signal on the display source may refer to a clock signal that is connected adjacent to the display source and has no transmission delay or a relatively small transmission delay, and the clock signal on the display source may be transmitted via the DDC to form a transmission-delayed clock signal on the display sink.

Figure 17:
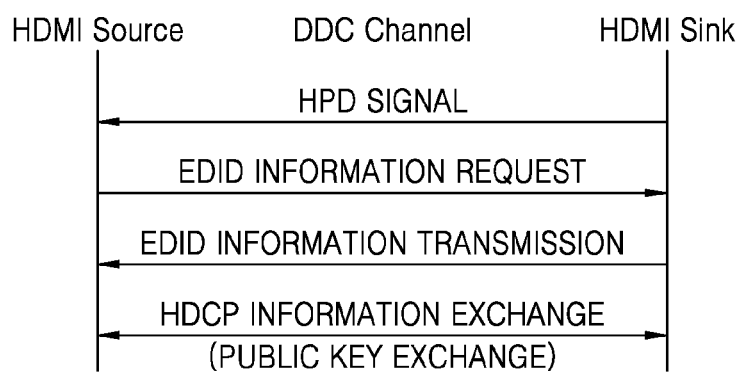
FIG. 17 is a diagram schematically showing a process of requesting information for exchanging extended display identification data (EDID) and high bandwidth digital content protection (HDCP) information between the display source and the display sink and a process of responding to the request therebetween.

FIG. 17 is a diagram schematically showing a process of requesting information for exchanging EDID and HDCP information between the display source and the display sink and a process of responding to the request therebetween.

Referring to the diagram, according to an embodiment, in an initial operation between the display source and the display sink, when the display sink detects the connection of the display source by the HPD signal and notifies that it is ready to respond to the request for rendering-related data about the display sink, such as the EDID, the display source requests the EDID information. In response to this request, the display sink may perform hand shaking to transmit the rendering-related EDID data, such as the resolution and scan rate, to the display source. Also, the request of EDID and the transmission of EDID may be made via the DDC. Accordingly, the communication between the display source and the display sink for reading the EDID data may be accomplished in the initial operation between the display source and the display sink. For example, after the main channel is set according to the EDID data and the data about a first image frame is transmitted via the main channel, separate communication may not be necessary. However, with respect to the HDCP data, unlike the EDID data, even after the main data (image data) is transmitted via the main channel, communication to exchange the HDCP public key between the display source and the display sink needs to be continuously performed at a certain time period. Therefore, as described above, it may be effective to store the EDID data on the display sink and then transmit the EDID data so that the EDID data is matched with the clock signal on the display source. However, in the case of the HDCP data that requires continuous exchange of HDCP public keys while the main channel is established and the main data is transmitted via the main channel, storing data on the display sink and transmitting the HDCP data to match the clock signal on the display source may not be suitable because this operation may increase the computational burden on the FPGA circuit.

Referring to FIGS. 13 and 16, in another embodiment, in order to prevent transmission errors of the auxiliary data transmitted via the DDC due to accumulating the first signal delay ① and the second signal delay ② while traveling back and forth between the display source and the display sink, low and high levels of the clock signal transmitted via the clock line SCL may be stretched.

In an embodiment, by forcibly adjusting the clock signal transmitted via the clock line SCL connected to the display source, for example, by forcibly increasing the low level of the clock signal, the rising edge of the ACK signal, the EDID data signal, and the HDCP signal transmitted from the display sink may be matched with the low signal of the clock signal. For example, the FPGA circuit, for example, the first FPGA circuit connected adjacent to the display source may capture data for the purpose of transmitting information, such as the ACK signal, EDID data signal, and HDCP data signal, which are transmitted from the display sink. The first FPGA circuit may forcibly extend the low signal of the clock signal at least during the period of the rising edge so that the rising edge of the data matches the low signal of the clock signal and does not match the high signal of the clock signal.

Referring to FIG. 13, in an embodiment, the first FPGA circuit may apply a control signal to the BJT of an open collector or the FET of an open drain connected in parallel to the DDC communication unit of the display source between the pull-up resistor and ground and may forcibly extend the low signal of the clock signal by adjusting the control signal input to a base or gate. For example, the first FPGA circuit may extend the low signal of the clock signal on the display source so that the low signal becomes longer than the high signal. For example, in an embodiment, the display source and the display sink may be connected to each other via the optical link. The first FPGA circuit connected to a location adjacent to the display source may adjust the clock signal transmitted via the clock line SCL connected to the DDC communication unit of the display source, and the second FPGA circuit connected to a location adjacent to the display sink may adjust the clock signal transmitted via the clock line SCL connected to the DDC communication unit of the display sink. In an embodiment, the clock signals of the display source and the display sink may be adjusted individually by the optical link connected between the display source and the display sink. For example, unlike a structure in which a DDC communication unit of a display source and a DDC communication unit of a display sink are directly connected to each other via a metal transmission line, in an embodiment in which the display source and the display sink are connected to each other via the optical link, the clock signals transmitted via the clock line SCL connected to the display source and the display sink may be adjusted individually.

As described above, in an embodiment of forcibly adjusting the clock signal of the clock line SCL connected to the display source, when the low signal on the clock line SCL is forcibly extended and the clock signal remains low, the above embodiment may be limited to the case of a display source that supports a multi-master function, which is defined to stand by without requiring control of a DDC on a display source. In the case of a display source that does not support the multi-master function, the above-described forced adjustment of the clock signal may not be suitable.

Referring to FIGS. 13 and 16, in another embodiment, by forcibly adjusting the clock signal transmitted via the clock line SCL connected to the display sink, for example, by forcibly shortening the high signal of the clock signal, the display sink may terminate the high signal of the clock signal early and start the rising edge of the ACK signal, EDID data signal, and HDCP data signal early so as to match the low signal of the clock signal. Accordingly, the timing of the rising edge is advanced, so that the data signals may be matched with the low level of the clock signal on the display source despite signal delay. Therefore, the rising edge of the ACK signal, EDID data signal, and HDCP data signal that matches the low signal of the clock signal may be prevented from being interpreted as the stop condition.

For example, the FPGA circuit, for example, the second FPGA circuit connected adjacent to the display sink, may capture the point at which data for the purpose of transmitting information, such as the ACK signal, EDID data signal, and HDCP data signal, is expected to be transmitted from the display sink, as in requests for EDID data or requests for HDCP data transmitted from the display source. Accordingly, the high signal of the clock signal may be forcibly shortened so that the rising edge of the ACK signal, EDID data signal, and HDCP data signal may start early.

Referring to FIG. 13, in an embodiment, the second FPGA circuit may apply a control signal to the BJT of an open collector or the FET of an open drain connected in parallel to the DDC communication unit of the display sink between the pull-up resistor and ground and may forcibly shorten the high signal of the clock signal by adjusting the control signal input to a base or gate. For example, the second FPGA circuit may shorten the high signal of the clock signal on the display sink so that the high signal becomes shorter than the low signal. For example, in an embodiment, the display source and the display sink may be connected to each other via the optical link. The first FPGA circuit connected to a location adjacent to the display source may adjust the clock signal transmitted via the clock line SCL connected to the DDC communication unit of the display source, and the second FPGA circuit connected to a location adjacent to the display sink may adjust the clock signal transmitted via the clock line SCL connected to the DDC communication unit of the display sink. For example, the first FPGA circuit may adjust the clock signal on the display source so as to forcibly extend the low signal of the clock signal on the display source and the second FPGA circuit may adjust the clock signal on the display sink so as to forcibly shorten the high signal of the clock signal on the display sink. By the adjustment of the clock signals of the first and second FPGA circuits, the rising edge of the ACK signal, EDID data, and HDCP data transmitted from the display sink may be matched with the low signal of the clock signal from the display source. For example, the rising edge may be prevented from being interpreted as a stop condition by matching the high signal of the clock signal on the display source.

According to an embodiment, the first signal delay ① of the clock signal transmitted from the display source to the display sink may overlap with the second signal delay ② of the ACK signal (or requested data accompanying the ACK signal) transmitted from the display sink toward the display source by matching the first-delayed clock signal. Also, the ACK signal from the display sink with overlapping the first and second signal delays ① and ② may be matched with a clock signal from the display source having no signal delay. In order to prevent the ACK signal from being interpreted as the stop condition due to the above conditions, the data from the display sink may be stored via the optical link (FPGA circuit) connected between the display source and the display sink. Subsequently, a process may be performed to transmit the stored data by matching the stored data to the clock signal of the display source, or a process may be performed to adjust the clock signal on the display source or the clock signal on the display sink. In an embodiment, the optical link that applies modulation and demodulation between electrical signals and optical signals may be connected between the display source and the display sink. For example, compared to the case in which the DDC communication unit of the display source and the DDC communication unit of the display sink are directly connected to each other via the metal transmission line without the intervention of the optical link, there is a possibility that signal delay or signal distortion may occur due to modulation and demodulation processing, such as modulation and demodulation. For example, the signal delay or signal distortion may occur due to nonlinearity between input and output depending on the behavior of photoelectric elements. Therefore, in an embodiment in which the optical link is applied, there may be a need to prevent a transmission error in which the data transmission is interrupted when a stop condition is unintentionally satisfied during the data transmission due to the process described above.

Referring to FIGS. 13 and 16, in another embodiment, it is possible to simultaneously adjust both the clock signal on the display source transmitted via the clock line SCL connected to the display source and the clock signal on the display sink transmitted via the clock line SCL connected to the display sink. That is, in an embodiment, the low signal of the clock signal on the display source may be extended, and the high signal of the clock signal on the display sink may be shortened. The first FPGA circuit connected adjacent to the display source may adjust the clock signal on the display source that matches the auxiliary data transmitted from the display sink, and the second FPGA circuit connected adjacent to the display sink may adjust the clock signal on the display sink that matches the auxiliary data transmitted from the display sink.

For reference, the FPGA circuit, the first FPGA circuit, and the second FPGA circuit described herein are provided as examples of control logic circuits of the optical link that constitutes the DDC for transmitting the auxiliary data between the display source and the display sink. For example, as an example of the control logic circuit that manages the overall control of the optical link, such as reading the contents of the auxiliary data, generating necessary control signals or storing the necessary auxiliary data, and changing some contents of the auxiliary data, the technical scope of the disclosure is not limited to the FPGA circuit, the first FPGA circuit, and the second FPGA circuit as described above. Any configuration that manages the control of the optical link may correspond to the FPGA circuit, the first FPGA circuit, and the second FPGA circuit described in this specification. Accordingly, the FPGA circuit, the first FPGA circuit, and the second FPGA circuit may be comprehensively understood as a control logic circuit, a first control logic circuit, and a second control logic circuit, respectively. Also, the control logic circuit, the first control logic circuit, and the second control logic circuit described in the claims may include the FPGA circuit, the first FPGA circuit, and the second FPGA circuit, respectively, described in the specification.

Figure 18:
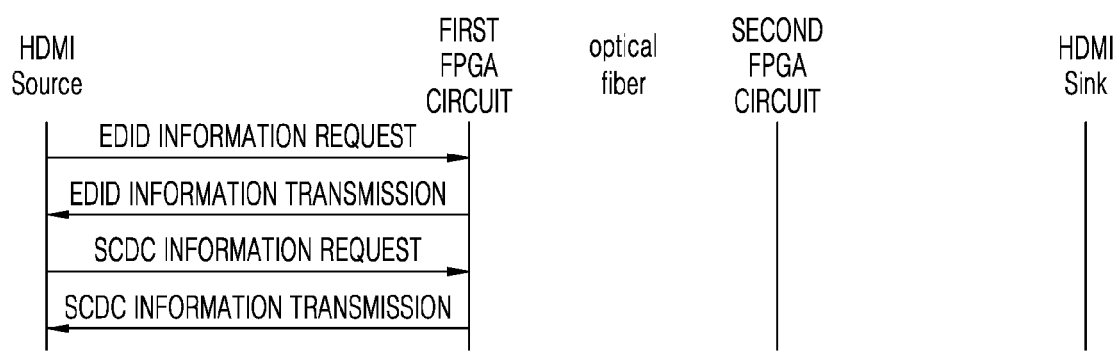
FIG. 18 is a diagram showing transmission as a request for EDID information and status and control data channel (SDCD) register information between the display source and the display sink and a response to the request therebetween, and schematically illustrates a configuration in which rapid transmission is achieved by storage and transmission of related data in the FPGA circuit.

FIG. 18 is a diagram showing transmission as a request for EDID information and status and control data channel (SDCD) register information between the display source and the display sink and a response to the request therebetween, and schematically illustrates a configuration in which rapid transmission is achieved by storage and transmission of related data in the FPGA circuit.

Referring to the diagram, the FPGA circuit, for example, the first FPGA circuit connected adjacent to the display source may store the EDID information and/or the SCDC register information related to rendering of the display sink and the SCDC register information related to setting of the main channel. Despite changes in the connection status of the display sink, such as the display sink being disconnected, the main data including image information may be transmitted immediately as the environment on the display sink normalizes, without having to performing hand shaking to obtain the EDID information and/or the SCDC register information from the beginning or performing link training to set up the main channel, based on the stored EDID information and/or the SCDC register information and the SCDC register information related to the main channel settings after the display sink is normally reconnected.

More specifically, the optical link according to another aspect of the disclosure, the optical link including the main channel connected between the display source and the display sink that constitute the HDMI system so as to transmit the main data including the image information and the DDC transmitting the auxiliary data related to rendering of the display sink, as the control logic circuit (corresponding to the FPGA circuit) that stores the auxiliary data transmitted via the DDC between the display source and the display sink and is involved in the transmission of the auxiliary data as a request for the auxiliary data transmitted from the display source to the display sink and a response thereto, may include the control logic circuit (corresponding to the FPGA circuit) that determines whether the auxiliary data requested from the display source may be transmitted and transmits the stored auxiliary data to the display source together with the ACK signal regarding whether the request for the auxiliary data is received by the display sink.

In an embodiment, the FPGA circuit may store the rendering data (the EDID information or SCDC register information), such as the frame rate, resolution, scan rate of the display sink and/or the data related to setting of the main channel (the link rate, the number of lanes, and the SCDC register information). As the display sink, in which a change in connection status has existed, is reconnected normally, without going through the hand shaking for EDID information or the link training to set up the main channel from the beginning, on the basis of the stored rendering data (the EDID information or SCDC register information) and/or the data related to the setting of the main channel (the SCDC register information), the main data including the image information may be transmitted immediately as the environment on the display sink normalizes, that is, as the display sink is reconnected normally again.

In an embodiment, as a request for the auxiliary data (the auxiliary data related to the rendering of the display sink or the auxiliary data related to the setting of the main channel) from the display source and the response thereto, the transmission of the auxiliary data may be performed by I2C data frames transmitted on the DDC.

Figure 19:
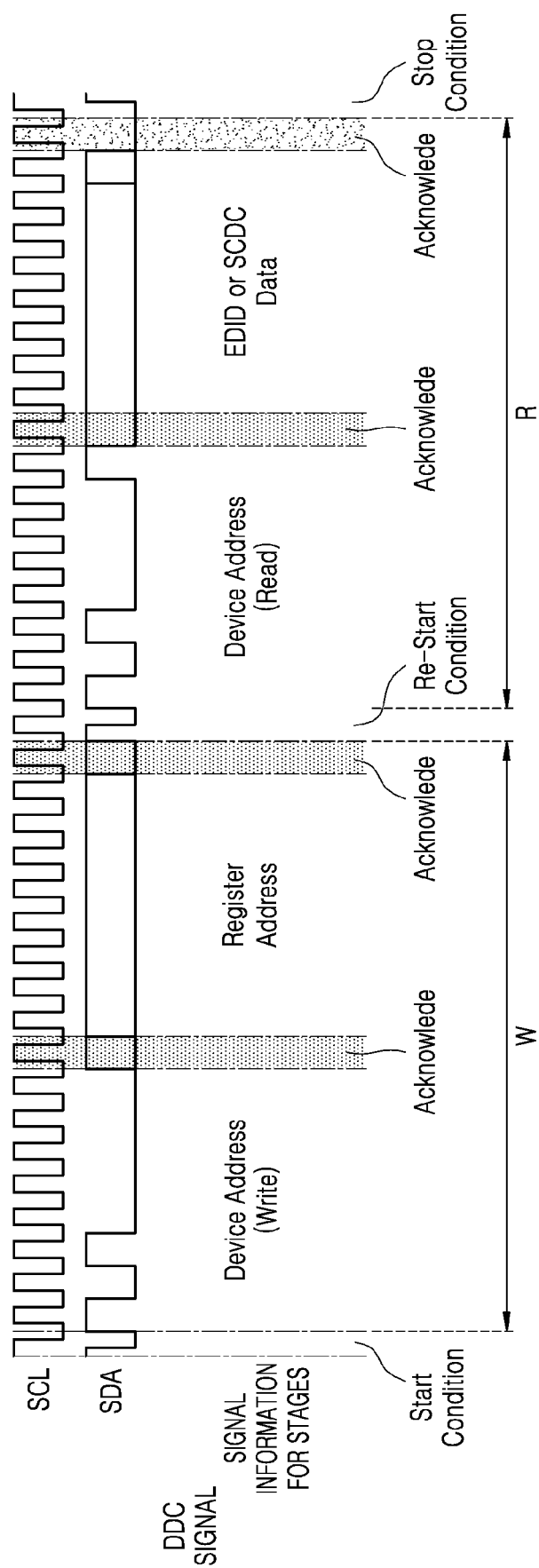
FIG. 19 is a diagram showing an inter-integrated circuit (I2C) data frame in which auxiliary data is requested from the display source and transmitted in response to the request, and illustrates signals of the clock line and the data line transmitted from the display source and the display sink so as to form the I2C data frame.

FIG. 19 is a diagram showing the I2C data frame in which the auxiliary data is requested from the display source and transmitted in response to the request, and illustrates signals of the clock line and the data line transmitted from the display source and the display sink so as to form the I2C data frame.

In an embodiment, the clock line SCL of the DDC may transmit the clock signal for synchronization between the display source and the display sink, and the falling edge/rising edge of the data line SDA is captured when the clock line SCL is in a high state. Accordingly, when the clock line SCL is in the high state, the falling edge of the data line SDA may be interpreted as a start condition (start bit) that informs of the start of data transmission. Also, when the clock line SCL is in the high state, the rising edge of the data line SDA may be interpreted as a stop condition (stop bit) that informs of the end of data transmission.

In an embodiment, as the request for the auxiliary data, such as the EDID data and SCDC register data, between the display source and the display sink and the response thereto, the transmission of the auxiliary data may be performed by the DDC. For example, in an embodiment, in the I2C communication between the display source and the display sink via the DDC, a request for data from the display source to the display sink and a response to the request for the data may be performed by the I2C data frame transmitted on the DDC. The I2C data frame may include a subframe W in a write mode and a subframe R in a read mode. For example, in an embodiment, the display source may transmit the I2C data frame to the display sink as shown in the diagram and request the information from the EDID data and/or SCDC register of the display sink. In an embodiment, in response to the request from the display source, the FPGA circuit, for example, the first FPGA circuit connected adjacent to the display source, may transmit the EDID information and/or SCDC register information, which has been stored in the first FPGA circuit, to the display source (the data of I2C data frame, EDID or SCDC data). The FPGA circuit does not transmit the request from the display source to the display sink, but directly transmits the EDID data and/or SCDC register information in response to the request from the display source (the data of I2C data frame, EDID or SCDC data). Accordingly, as in the rendering information on the display sink and the setting information of the main channel, the information exchange necessary for the transmission of the main data including the image information may be quickly performed between the display source and the display sink. For example, as the display sink, in which the change in connection status has been existed, is reconnected normally, the display source may transmit the main data including the image information immediately after normal reconnection of the display sink according to the EDID information or SCDC register information before the change in connection status transmitted from the FPGA circuit.

In an embodiment, as the request for the auxiliary data from the display source and the response thereto, the FPGA circuit participates in the transmission of the auxiliary data. Accordingly, the main data including the image information may be transmitted immediately as the environment on the display sink normalizes. For example, there is no need to perform the hand shaking or the link training again between the display source and the display sink as in the initial operation.

Referring to FIG. 19, the transmission of the auxiliary data, with respect to the request for the auxiliary data from the display source and the response thereto, may be performed by the I2C data frame transmitted on the DDC. The I2C frame may include the subframe W in the write mode and the subframe R in the read mode. In an embodiment, the subframe W in the write mode may include a device address (corresponding to Target ID) following a start bit Start Condition, a read/write bit (R/W bit) as the last bit of the device address and an ACK bit following the device address, a subsequent register address (corresponding to the Register Address, Target Address) and the ACK bit, and an ACK bit indicating whether to receive each of the device address and the register address, after the device address and the register address. For example, as the read/write bit, a high signal may correspond to "Read" and a low signal may correspond to "Write". As the ACK bit, a low signal may refer to successful reception of the corresponding message, and a high signal may refer to failure of reception of the corresponding message.

In an embodiment, in the subframe W of the write mode, the device address may set the corresponding display sink as the target ID (Target Address), and the register address may set the address of the EDID ROM or SCDC register as the target address. In the ACK bit following each of the device address and the register address, an ACK signal (low signal) or NACK signal (high signal) may be transmitted from the display sink. In an embodiment, the ACK bit may be transmitted from an FPGA circuit involved in the transmission of auxiliary data between the display source and the display sink as a request for the auxiliary data and a response thereto. For the auxiliary data (EDID data or SCDC register data) requested from the display source, depending on whether transmission of the requested data from the FPGA circuit is possible, the FPGA circuit may transmit the ACK signal (low signal) when it is determined that the transmission from the FPGA circuit is possible and may transmit the NACK signal (high signal) when it is determined that the transmission from the FPGA circuit is impossible.

Unlike in an embodiment, in the transmission of the auxiliary data as the request for the auxiliary data and the response thereto between the display source and the display sink, for example, without the FPGA circuit involved, the ACK bit may be transmitted from the display sink. For example, when a message from the display source is successfully received, the ACK signal (low signal) may be transmitted. On the other hand, when a message from the display source is not received, the NACK signal (high signal) may be transmitted. However, in an embodiment, through the FPGA circuit involved in the transmission of the auxiliary data as the request for the auxiliary data and the response thereto between the display source and the display sink, the ACK bit may transmit the ACK signal (low signal), for example, when it is determined that the auxiliary data requested from the display source may be transmitted from the FPGA circuit and may transmit the NACK signal (high signal), for example, when it is determined that the auxiliary data requested from the display source cannot be transmitted from the FPGA circuit.

In an embodiment, depending on the auxiliary data requested from the display source, for example, the FPGA circuit that checks the auxiliary data requested from the display source from the device address and register address may call the requested auxiliary data from the stored auxiliary data and transmit the auxiliary data to the display source and may transmit the ACK signal (low signal) as the ACK bit to prevent re-request for the auxiliary data for the display sink. For example, the FPGA circuit that receives the I2C data frame transmitted from the display source on the DDC between the display source and the display sink may identify the corresponding display sink in a one-to-many or many-to-many connection between the display source and the display sink from the device address and register address transmitted from the display source. For example, the FPGA circuit may identify auxiliary data requested from the display source on the basis of the address information of the EDID ROM in which the EDID data is stored or the address information of the SCDC register in which the SCDC data is stored in the corresponding display sink. When it is determined that transmission of the requested auxiliary data from pre-stored EDID data or SCDC data is possible, that is, when the auxiliary data requested from the display source corresponds to pre-stored auxiliary data, the FPGA circuit may transmit the auxiliary data requested for the display source (I2C data frame data (EDID or SCDC data)) and transmit the ACK signal (low signal) as the ACK bit to prevent the re-request from the display source. However, unlike the above, for the display sink identified by the device address and register address transmitted from the display source or the auxiliary data identified by the address information of the EDID ROM in which the EDID data is stored or the address information of the SCDC register in which the SCDC data is stored, when the transmission from the FPGA circuit is determined to be impossible, that is, when the auxiliary data requested from the display source is not stored in advance, the FPGA circuit may transmit the NACK signal (high signal) as the ACK bit so that the re-request for the corresponding auxiliary data is made from the display source to the display sink.

In an embodiment, for the auxiliary data, such as the EDID data and/or SCDC register data from the display source, the I2C data frame for transmitting the auxiliary data as a request for the auxiliary data from the display source and a response thereto from the display sink may substantially correspond to the read mode that requests transmission of the auxiliary data from the display source to the display sink. The I2C data frame may include a preceding subframe W of the write mode and a following subframe R of the read mode before and after the restart bit (Re-Start Condition). The substantial communication may occur from the restart bit (Re-Start Condition) after the subframe W in the write mode, and the subframe R in the read mode may start from the restart bit (or Re-Start Condition). For example, in an embodiment, the subframe W of the write mode preceding the restart bit (or Re-Start Condition) may correspond to a dummy write for transmitting the subframe R in the read mode that follows the restart bit (or Re-Start Condition). However, in an embodiment, the auxiliary data requested from the display source may be identified from the device address and register address that form the subframe W of the write mode. For example, the display sink requesting the auxiliary data may be identified in a one-to-many or many-to-many connection between the display source and the display sink. The auxiliary data requested from the display source may be identified from the address information of the EDID ROM in which the EDID data is stored and/or the address information of the SCDC register in which SCDC data is stored.

In an embodiment, the I2C data frame on the DDC regarding the request for auxiliary data between the display source and the display sink and the transmission of the auxiliary data in response thereto may include the subframe R in the read mode as shown in the diagram. The subframe R in the read mode may include a device address (corresponding to a target ID) including address information about the display sink for which the auxiliary data is requested and a read/write bit (R/W bit) following the device address and the ACK bit regarding whether the device address has been received. After the ACK bit, 8 bits of data (EDID or SCDC data) including information on the auxiliary data requested from the display source may be connected. For example, the EDID data or SCDC data requested from the display source may be transmitted as the data (EDID or SCDC Data), and the auxiliary data (EDID data or SCDC data) transmitted as data in these I2C data frames may be transmitted from the FPGA circuit. For example, as the ACK bit in the subframe W in the write mode and the subframe R in the read mode, for example, for a total of 3 ACK bits including the ACK bit regarding whether the device address and the register address are received in the subframe W of the write mode and the ACK bit regarding whether the device address is received in the subframe R of the read mode, the FPGA circuit may transmit the auxiliary data (EDID data or SCDC data) requested as data (EDID or SCDC Data) of the subframe R in the read mode while transmitting the ACK signal (low signal). For example, in an embodiment, when the NACK signal is sent to represent reception failure regarding whether the corresponding message has been received for any one ACK bit among the total of three ACK bits that includes the ACK bit regarding whether the device address and register address are received in the subframe W of the write mode and the ACK bit regarding whether the device address is received in the subframe R of the read mode, the display source transmits a re-request for auxiliary data to the display sink. Accordingly, for the total of three ACK bits corresponding to the reply from the display source or FPGA circuit corresponding to an opponent of the transmission, among the ACK bits of the I2C data frame, the FPGA circuit may collectively transmit the ACK signal (low signal) or the NACK signal (high signal) depending on whether the auxiliary data requested from the FPGA circuit may be transmitted. For reference, the ACK bit immediately before the stop bit (Stop Condition) representing the end of the I2C data frame is transmitted from the display source not the display sink, and thus, the FPGA circuit may not be involved in the ACK bit immediately before the stop bit (Stop Condition). The ACK bit immediately before the stop bit (Stop Condition) may be transmitted from the display source that receives the data (EDID or SCDC data).

On the other hand, for the auxiliary data identified from the display sink and the address information (e.g., the address information of EDID ROM and SCDC register) in which the auxiliary data is requested from the device address and register address of the subframe W in the write mode, when it is determined that transmission from the FPGA circuit is not possible because the auxiliary data requested from the display source is not stored in advance, the FPGA circuit transmits the NACK signal (high signal) as the ACK bits (the total of 3 ACK bits) of the subframe W of the write mode and the subframe R of the read mode.

Referring to FIG. 19, in the I2C data frame relating to transmission of auxiliary data as a request for the auxiliary data and a response thereto between the display source and the display sink, the ACK bit following the data (EDID or SCDC Data), through which the auxiliary data requested from the display source is transmitted, may be transmitted from the display source, unlike the ACK bit at another location in the I2C data frame. When the transmitted auxiliary data (EDID or SCDC Data) is successfully received from the display source, the ACK signal (low signal) may be transmitted. Also, the transmitted auxiliary data (EDID or SCDC Data) is not received, the NACK signal (high signal) may be transmitted.

Through this specification, a feature in which the auxiliary data is transmitted as a request for the auxiliary data and the response thereto by the transmission of the I2C data frame between the display source and the display sink as shown in FIG. 19 may indicate that a corresponding I2C data frame is transmitted between the display source and the FPGA circuit involved in requesting and transmitting the auxiliary data, for example, the first FPGA circuit adjacent to the display source. For example, a message may be transmitted to the display sink or a message may not be transmitted from the display sink. For example, as shown in FIG. 13, the FPGA circuit may include the first FPGA circuit connected adjacent to the display source and the second FPGA circuit connected adjacent to the display sink. The display source (DDC communication unit) and the first FPGA circuit may transmit the I2C data frame via the DDC including the clock line SCL that transmits the clock signal and the data line SDA that transmits the data signal. Similarly, the display sink (DDC communication unit) and the second FPGA circuit may also transmit I2C frames via the DDC including the clock line SCL and the data line SDA. Since the display source and the display sink are connected to each other via an optical cable, even if the clock line SCL and the data line SDA forming the DDC transition from the high signal to the low signal or from the low signal to the high signal, the transition of the signals may not be transmitted directly between the display source and the display sink. For example, the FPGA circuit, for example, the first FPGA circuit connected adjacent to the display source, may obtain the I2C data frame including the request for auxiliary data from the display source and may transmit the pre-stored auxiliary data in response to the request from the display source and transmit the ACK signal with the ACK bit. Here, the FPGA circuit, for example, the first FPGA circuit adjacent to the display source, may be involved in requesting the auxiliary data from the display source and transmitting the requested auxiliary data in response thereto and may prevent the I2C data frame from being transmitted to the display sink.

In an embodiment, the control logic circuit (corresponding to the FPGA circuit) may store the EDID information or SCDC register information as the auxiliary data related to the rendering on the display sink and may transmit the pre-stored EDID information or SCDC register information in response to the request from the display source.

In various embodiments, the FPGA circuit may store SCDC register information as auxiliary data related to the setting of the main channel along with the EDID information or SCDC register information as auxiliary data related to the rendering on the display source and may transmit the pre-stored EDID information or SCDC register information in response to the request from the display source.

Main channels according to various embodiments may transmit main data including image information, using a transition minimized differential signaling (TMDS) architecture (TMDS mode, e.g., HDMI 2.0) or using a fixed rate link (FRL) architecture (FRL mode, e.g., HDMI 2.1).

Figure 20:
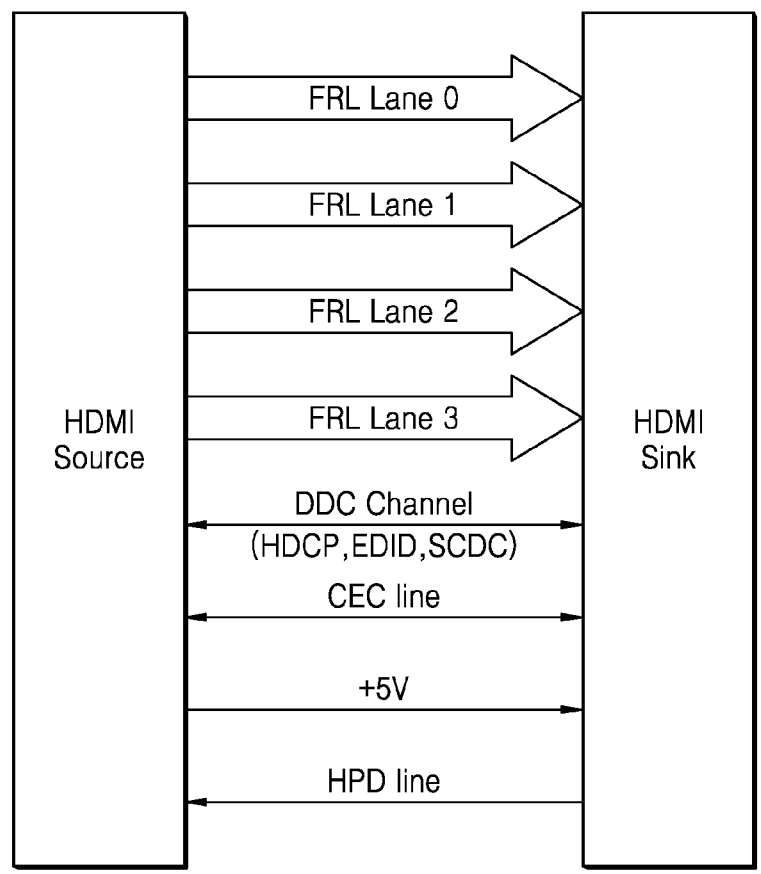
FIG. 20 is a diagram showing the configuration of an optical link that mediates signal transmission between the display source and the display sink and illustrates a fixed rate link (FRL) architecture that is different from a transition minimized differential signaling (TMDS) architecture of FIG. 3.

As shown in FIG. 3, in the TMDS architecture (TMDS mode), a total of four main channels may be provided, which includes three main channels Channel 0, Channel 1, and Channel 2 for transmission of image data, such as R, G, B or YCbCr, and one main channel Clock Channel for the pixel clock. Also, an independent channel may be allocated for transmission of the pixel clock. Unlike the above TMDS architecture (TMDS mode), in a fixed rate link (FRL) architecture (FRL mode) as shown in FIG. 20, a pixel clock may be embedded in a data signal, and a clock signal may be recovered by clock recovery on a display sink. Accordingly, a new data channel is added instead of allocating an independent channel for transmission of the pixel clock, and thus, main data including image information may be transmitted using four data channels FRL Lane 0, FRL Lane 1, FRL Lane 2, and FRL Lane 3.

In an embodiment, in the FRL architecture (FRL mode), link training may be performed to set the link rate, the number of channels, or the like as data related to the setting of the main channel, and the data related to setting of the main channel by the link training between the display source and the display sink may be stored in the SCDC register or Config register.

In an embodiment, the display source may obtain the EDID information and SCDC register information via the DDC and check rendering data related to the frame rate, resolution, and scan rate of the display sink and information about whether the FRL mode is supported. The display source may set an appropriate main channel on the basis of the EDID information and SCDC register information obtained from the display sink, transmit a training pattern set based on the EDID information and SCDC information via the main channel, and perform the link training, which is a process to check whether the display sink has properly received the pattern. Through this link training, the display source may determine an optimal transmission method (e.g., the link rate, the number of lanes, etc.), and the main data, such as video signals and audio signals, may be transmitted via the main channel that is set by the link training.

Figure 21:
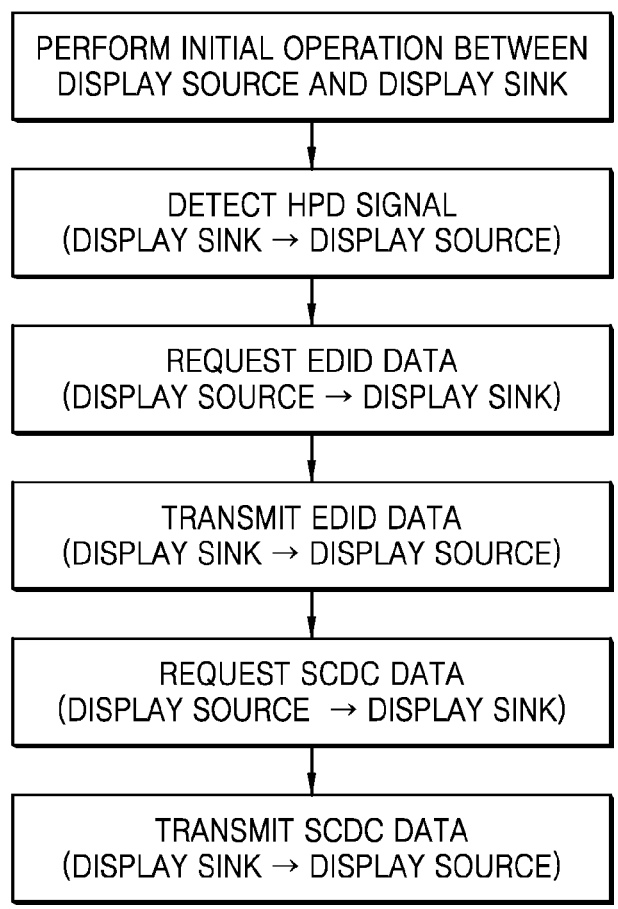
FIG. 21 is a flowchart showing a process of hand shaking between the display source and the display sink.

FIG. 21 is a flowchart showing a process of hand shaking between the display source and the display sink.

Referring to the diagram, in an initial operation between the display source and the display sink, when the display sink detects the connection of the display source by the HPD signal and notifies that it is ready to respond to the requests for rendering-related data, such as EDID, the display source may request the EDID information and/or the SCDC register information. In response to the request, the display sink may transmit the rendering-related data, such as the frame rate, resolution, and scan rate, the EDID data and/or SDCD register information about whether the display sink supports the FRL mode or the like, and the SDCD register information about main channel settings, such as the link rate, the number of lanes, etc. That is, hand shaking may be performed as described above. Also, after the hand shaking, the link training for setting the main channel may be performed between the display source and the display sink. Through this specification, there is a sequence of requesting the rendering-related data on the display sink from the display source that detects the HPD signal in the first connection between the display source and the display sink and then obtaining, in response to the request, the rendering data about the frame rate, resolution, scan rate, or the like from the display sink, or there is a sequence of requesting information related to the settings of the main channel for the display sink from the display source so as to set the main channel between the display source and the display sink and then transmitting, in response to the request, the information for setting the main channel, for example, information about whether the display sink supports the FRL mode, the link rate, and the number of lanes of the main channel, or the like. The above sequences may be initiated through the hand shaking, requesting information on the display sink from the display source that detects the HPD signal, initiated through the process of link training, or carried out as a process of link training including the hand shaking.

Figure 22:
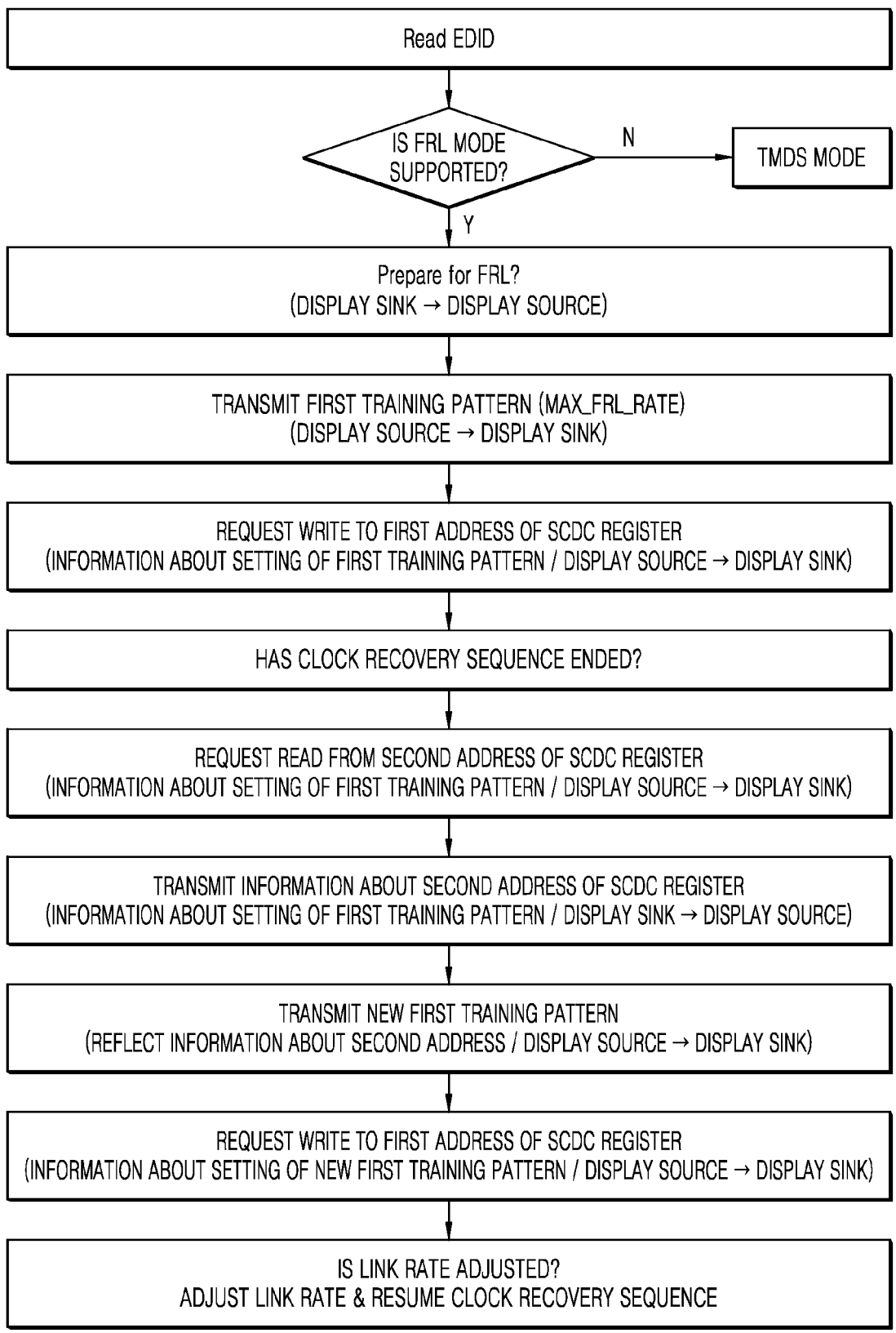
FIGS. 22 and 23 are flowcharts showing processes of a clock recovery sequence and a channel equalization sequence, respectively, which are performed in link training to set up the main channel between the display source and the display sink.
Figure 23:
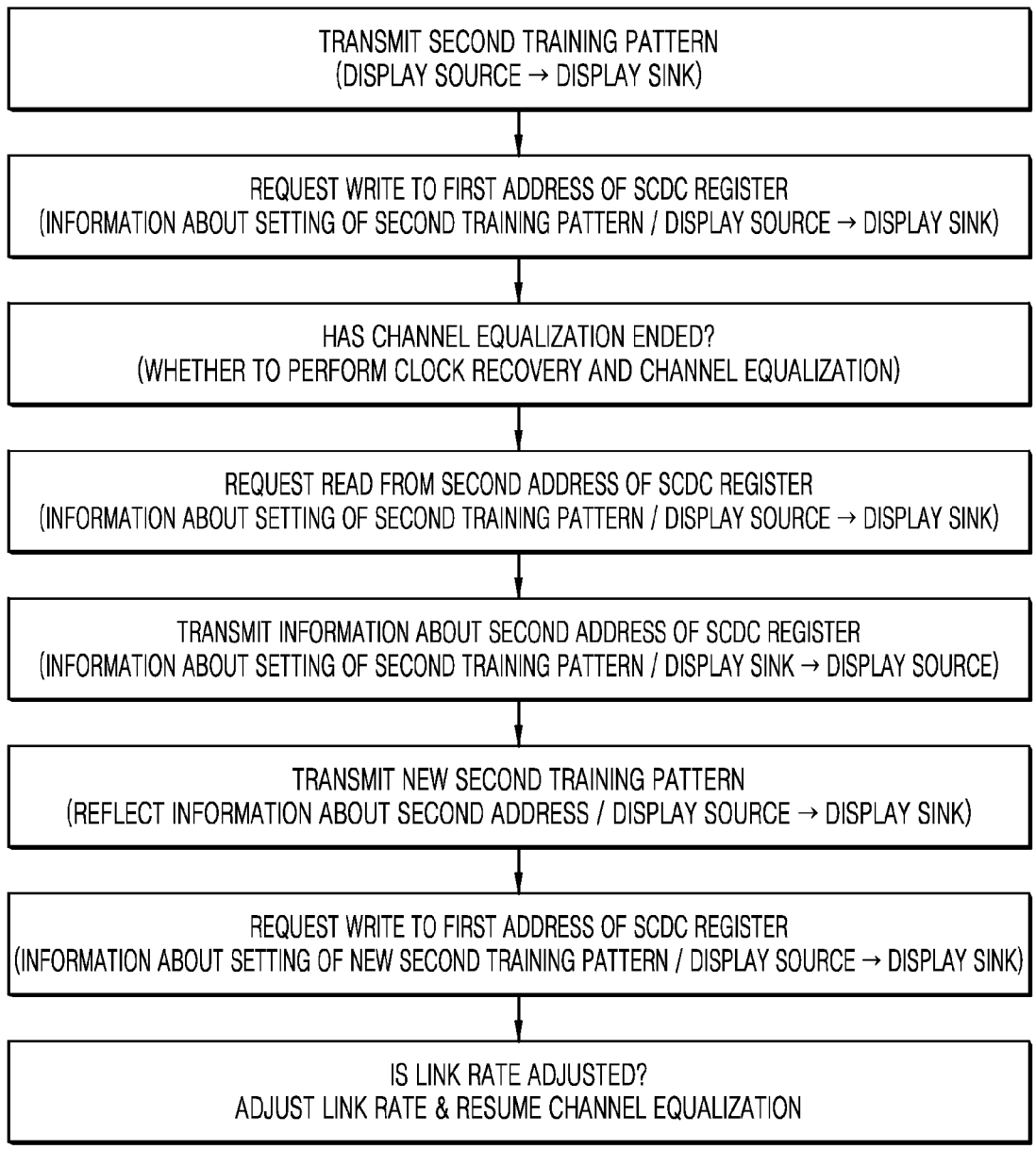

FIGS. 22 and 23 are flowcharts showing processes of a clock recovery sequence and a channel equalization sequence, respectively, which are performed in link training to set up the main channel between the display source and the display sink.

In an embodiment, the display source may obtain information about whether the display sink supports the FRL mode on the basis of the EDID information on the display sink. Also, when the display sink does not support the FRL mode, the main data including image information may be transmitted in the TMDS mode.

When the display source reports, based on the EDID information of the display sink, that the corresponding display sink supports the FRL mode and it is ready for link training from the display sink (Status Flag to indicate ready for link training), the display source transmits a first training pattern toward the display sink at the highest channel rate (MAX_FRL_Rate) on the basis of the EDID information and/or SDCD register information of the display sink and may check whether the transmitted training pattern has been properly received by the display sink, for example, whether clock recovery has been performed appropriately. Here, the display source may request "write" to the SDCD register (e.g., a first address) for information about the setting of the first training pattern via the DDC. Depending on whether reception of the display sink is successful or not, for example, whether the clock is recovered, the display sink may request a new channel rate for the display source. For example, the display source requests "read" from the SCDC register to the display sink, and the display sink may transmit information (new channel rate) stored in the SCDC register (a second address) in response to the request. The display source may transmit the first training pattern at a new channel rate that reflects the request from the display source. In an embodiment, the display source may transmit the training pattern at a new channel rate by reflecting the request from the display sink depending on whether the transmitted first training pattern is successfully received or the clock is recovered. The information about the first training pattern (channel speed, link rate, FRL_rate) may be stored in the SCDC register or Config register, and the information about the number of lanes for link training may be stored.

In an embodiment, depending on whether the display sink successfully receives the first training pattern or whether the clock is recovered, the clock recovery sequence for setting the link rate may be terminated, and the channel equalization sequence as shown in the diagram may be initiated.

The main channel according to various embodiments may transmit the main data including the image information, using the TMDS architecture (TMDS mode, e.g., HDMI 2.0) or using the FRL architecture (FRL mode, e.g., HDMI 2.1). The FRL mode may support up to 12 Gbps per channel and may apply equalization, predicting the loss of signal attenuation that occurs in high-speed links due to an increase in transmission speed and intentionally generating a distorted signal to contain an appropriate amount of pre-emphasis or de-emphasis.

In an embodiment, the channel equalization sequence may include settings for the pre-emphasis or de-emphasis. In an embodiment, in the link training, the display source may sequentially perform the clock recovery sequence and the channel equalization sequence. In the clock recovery sequence, the display source transmits, to the display sink, the first training pattern in which the basic settings of the main channel are reflected so as to set the link rate, and checks whether the first training pattern has been properly received by the display sink or whether the clock signal has been appropriately restored from the first training pattern. Also, depending on whether the first training pattern is successfully received by the display sink or whether the clock signal is recovered, the clock recovery sequence may be terminated, and the channel equalization sequence may be initiated. In the channel equalization sequence, a second training pattern having a more complex pattern, rather than the basic settings of the main channel, is transmitted via the main channel, and it is possible to check whether the second training pattern has been properly received by the display sink or the clock signal has been appropriately restored and whether the channel equalization has been performed. Here, the display source may make a "write" request to the SCDC register (first address) for information about the setting of the second training pattern, for example, the pre-emphasis or de-emphasis information via the DDC. Depending on whether the clock recovery of the display sink and the channel equalization are performed, the display source may terminate the channel equalization sequence and transmit main data including image information using the main channel settings optimized by the link training.

In the channel equalization sequence, the display source may resume the clock recovery sequence when the clock recovery fails. Also, when the clock recovery is achieved but the channel equalization fails, the display source may transmit a new second training pattern having a changed level of pre-emphasis or de-emphasis to the display sink according to the request from the display sink. Here, the display source requests "Read" from the SCDC register (second address) for the display sink. In response to the request, the display sink may transmit the information stored in the SCDC register. The display source may transmit, to the display sink, a new second training pattern in which the level of pre-emphasis or de-emphasis is changed by reflecting the information of the received SCDC register.

As described above, in an embodiment, in the link training, the information about the basic settings of the main channel, such as the link rate and the number of lanes, and the information about the channel equalization, such as the level of pre-emphasis or de-emphasis, may be stored in the SCDC register. The display source, which transmits the first training pattern regarding the basic settings or the second training pattern regarding the channel equalization to the display sink via the main channel, may make a "write" request for the setting information of the first and second training patterns via the DDC. Accordingly, the SCDC register of the display sink may store setting information regarding the link rate, the number of lanes, and the level of pre-emphasis or de-emphasis.

In an embodiment, the FPGA circuit may be involved in communication of the auxiliary data, for example, the request for rendering-related auxiliary data, such as the frame rate, resolution, and scan rate, and the transmission of the auxiliary data in response to the request between the display source and the display sink and may store the rendering-related auxiliary data. For example, the FPGA circuit may obtain the auxiliary data transmitted on the DDC between the display source and the display sink and store the rendering-related auxiliary data. According to the rendering-related auxiliary data, the main channel is set between the display source and display sink. Through the set main channel, the auxiliary data close to the transmission time point at which the main data including image information is transmitted may be updated with the latest information.

In an embodiment, as the auxiliary data related to rendering on the display sink, the display sink may store a plurality of pieces of rendering data, such as the frame rate, resolution, and scan rate. For example, in the EDID data of the display sink, various resolution settings may be possible with detailed settings in addition to the basic resolution information. Accordingly, the rendering-related auxiliary data may be changed by user settings or the like. In an embodiment, through the main channel set according to the rendering-related auxiliary data updated with the latest information, the FPGA circuit may store the auxiliary data updated with the latest information closest to the transmission time point at which the main data including image information is transmitted.

In an embodiment, the optical link may further include the HPD line for transmitting the hot plug signal from the display sink. When the hot plug signal is recovered by normal reconnection of the display sink after the change in the hot plug signal caused by the change in the connection status of the display sink, such as the display sink being disconnected, the FPGA circuit may transmit the stored auxiliary data to the display source in response to the requested auxiliary data.

For example, the HPD line may be configured to transmit the hot plug signal (HPD signal) in one direction from the display sink to the display source. The HPD line may be configured to transmit the HPD signal that includes the signal indicating that the display sink has detected cable connection and the interrupt request when the status of the display sink varies or the data reception is not properly performed.

In an embodiment, as the HPD signal is recovered by the normal reconnection of the display sink after the change in the connection state of the display sink, such as the display sink being disconnected, the display source may transmit the main data including the image information immediately after the normal reconnection of the display sink, according to the EDID information or SCDC register information before the change in the HPD signal transmitted from the FPGA circuit. That is, in an embodiment, despite a change in the connection state on the display sink or a change in the HPD signal due to a change in the connection state, the display source may not return to the initial operation so as to transmit EDID information and/or SCDC information or to perform link training for setting the main channel.

According to the disclosure, the optical link may be provided that prevents data transmission errors due to transmission delay. More specifically, in the optical link according to the disclosure, the data for the purpose of transmitting information, such as the ACK signal, EDID data, and HDCP data may be prevented from being read as the control signal for controlling the data transmission itself, for example, the stop signal representing the end of transmission, according to the degree of delay of the clock signal to be matched.

According to the disclosure, regarding the auxiliary data related to the rendering of the display sink or the setting of the main channel between the display source and the display sink, the optical link may be provided, which is involved in the transmission of the auxiliary data as the request for the EDID information and SCDC register information and the response to the request and achieves the rapid transmission by the storage and transmission of the auxiliary data.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

INDUSTRIAL APPLICABILITY

The disclosure may be applied to an optical link that transmits main data including image information and auxiliary data including rendering data of a display sink between a display source and the display sink that constitute an HDMI system.

What is claimed is:

1. An optical link connected between a display source and a display sink to constitute a high-definition multimedia interface (HDMI) system and comprising a main channel for transmitting main data comprising image information and a display data channel (DDC) that transmits auxiliary data related to rendering of the display sink,
    wherein the optical link comprises a control logic circuit, which stores the auxiliary data transmitted via the DDC between the display source and the display sink and is involved in transmission of the auxiliary data according to a request for the auxiliary data transmitted from the display source to the display sink and a response to the request, and
    the control logic circuit determines whether the auxiliary data requested from the display source is transmittable, and transmits the stored auxiliary data to the display source together with an acknowledgment (ACK) signal indicating whether the display sink receives the request for the auxiliary data,
    wherein the transmission of the auxiliary data according to the request for the auxiliary data from the display source and the response to the request is performed by an inter-integrated circuit I2C data frames transmitted on the DDC, and
    the control logic circuit determines whether the auxiliary data requested from the display source is transmittable from a device address comprising address information of the display sink to which the auxiliary data is requested and a register address comprising register address information of the requested auxiliary data, among the I2C data frames.

2. The optical link of claim 1, wherein the control logic circuit transmits, to the display source, the ACK signal regarding whether the display sink receives the request for the auxiliary data, prior to the auxiliary data requested from the display source.

3. The optical link of claim 1, wherein the control logic circuit
    identifies the display sink to which the auxiliary data is requested from the device address, and
    identifies the auxiliary data requested from the address information of an extended display identification data read-only memory (EDID ROM) or a status control data channel (SCDC) register according to reading of the register address.

4. The optical link of claim 1, wherein the transmission of the auxiliary data according to the request for the auxiliary data from the display source and the response to the request is performed by the I2C data frames transmitted on the DDC,
    the I2C data frames comprise, before and after a re-start bit, a subframe in a write mode preceding the re-start bit and a subframe in a read mode following the re-start bit, and
    the control logic circuit determines whether the auxiliary data requested from the display source is transmittable from a device address and a register address of the subframe in the write mode.

5. The optical link of claim 4, wherein the control logic circuit, which has determined that the auxiliary data requested from the display source is transmittable,
    transmits an ACK signal as an ACK bit indicating whether the display sink receives the device address and the register address of the subframe in the write mode and transmits the requested auxiliary data as data of the subframe in the read mode.

6. The optical link of claim 5, wherein the control logic circuit, which has determined that the auxiliary data requested from the display source is transmittable, transmits an ACK signal as an ACK bit indicating whether the display sink receives the device address and the register address of the subframe in the write mode and the device address of the subframe in the read mode.

7. The optical link of claim 1, wherein the control logic circuit, which has determined that the auxiliary data requested from the display source is transmittable, transmits an ACK signal as an ACK bit forming the I2C data frames and transmits the auxiliary data requested as data forming the I2C data frames.

8. The optical link of claim 1, wherein the control logic circuit, which has determined that the auxiliary data requested from the display source is non-transmittable, transmits a no-acknowledgment (NACK) signal as an ACK bit forming the I2C data frames to re-request the auxiliary data from the display source to the display sink.

9. The optical link of claim 1, wherein the control logic circuit stores EDID information or SCDC register information as the auxiliary data related to rendering of the display sink and SCDC register information as the auxiliary data related to setting of the main channel.

10. The optical link of claim 9, wherein the auxiliary data related to the settings of the main channel comprises information about a link rate or a number of lanes set for the main channel by link training that checks whether a training pattern is transmitted from the display source and whether the transmitted training pattern is received.

11. The optical link of claim 9, wherein the auxiliary data related to the settings of the main channel comprises information about pre-emphasis or de-emphasis related to channel equalization set for the main channel by link training that checks whether a training pattern is transmitted from the display source and whether the transmitted training pattern is received.

12. The optical link of claim 9, wherein the HDMI system supports a transition minimized differential signaling (TMDS) mode and a fixed rate link (FRL) mode.

13. The optical link of claim 1, wherein the control logic circuit stores the auxiliary data transmitted via the DDC between the display source and display sink and updates the auxiliary data with latest information close to a time when the main data comprising the image information is transmitted.

14. The optical link of claim 1, wherein the control logic circuit, after the main data comprising the image signal is transmitted via the main channel set from hand shaking or link training in an initial operation between the display source and display sink, is involved in transmission of the auxiliary data according to the request for the auxiliary data from the display source and the response to the request as the display sink, in which a connection status has been changed, is reconnected normally, and transmits the stored auxiliary data to the display source in response to the requested auxiliary data.

15. The optical link of claim 14, further comprising a hot plug detection (HPD) line for transmitting a hot plug signal from the display sink, wherein the control logic circuit transmits the stored auxiliary data to the display source in response to the requested auxiliary data when the hot plug signal is recovered by normal reconnection of the display sink after a change in the hot plug signal according to the connection status of the display sink.

16. The optical link of claim 15, wherein, as the hot plug signal is recovered by the normal reconnection of the display sink after the change in the hot plug signal according to the connection status of the display sink, the display source transmits the main data comprising the image information, immediately after the normal reconnection of the display sink according to EDID information or SCDC register information before the change in the hot plug signal transmitted from the control logic circuit.

* * * * *